(12) United States Patent
Chang et al.

(10) Patent No.: US 9,172,662 B2
(45) Date of Patent: Oct. 27, 2015

(54) VIRTUAL CHASSIS SYSTEM CONTROL PROTOCOLS

(71) Applicants: Amy Chung-Hua Chang, Temple City, CA (US); Roberto H. Jacob Da Silva, Oak Park, CA (US); Nalinakshan Kunnath, Camarillo, CA (US); Ignatius D. Santoso, Thousand Oaks, CA (US); Anand Vinayagam, Oak Park, CA (US)

(72) Inventors: Amy Chung-Hua Chang, Temple City, CA (US); Roberto H. Jacob Da Silva, Oak Park, CA (US); Nalinakshan Kunnath, Camarillo, CA (US); Ignatius D. Santoso, Thousand Oaks, CA (US); Anand Vinayagam, Oak Park, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 364 days.

(21) Appl. No.: 13/674,392

(22) Filed: Nov. 12, 2012

(65) Prior Publication Data

US 2013/0064102 A1 Mar. 14, 2013

Related U.S. Application Data

(63) Continuation-in-part of application No. 13/010,168, filed on Jan. 20, 2011, now Pat. No. 8,767,735.

(60) Provisional application No. 61/370,622, filed on Aug. 4, 2010, provisional application No. 61/658,159, filed on Jun. 11, 2012.

(51) Int. Cl.
*H04L 12/939* (2013.01)
*H04L 12/931* (2013.01)
*H04L 12/775* (2013.01)
*H04L 12/709* (2013.01)
*H04L 12/707* (2013.01)
*H04L 12/703* (2013.01)

(52) U.S. Cl.
CPC ............ *H04L 49/552* (2013.01); *H04L 45/245* (2013.01); *H04L 45/58* (2013.01); *H04L 49/65* (2013.01); *H04L 49/70* (2013.01); *H04L 45/22* (2013.01); *H04L 45/28* (2013.01)

(58) Field of Classification Search
CPC ..... H04L 49/70; H04L 45/586; H04L 45/583; H04L 45/58; H04L 49/357; H04L 45/245
See application file for complete search history.

(56) References Cited

U.S. PATENT DOCUMENTS 7,483,383 B2 1/2009 Santoso et al.
7,505,403 B2 3/2009 Santoso et al.
(Continued)

OTHER PUBLICATIONS

Hedrick; Routing Information Protocol; IETF Network Working Group; RFC 1058; Jun. 1, 1988; pp. 1-33.
(Continued)

*Primary Examiner* — Jung Park
(74) *Attorney, Agent, or Firm* — Loza & Loza, LLP

(57) ABSTRACT

A virtual chassis system includes a plurality of network nodes configured with a master virtual chassis address. The network nodes are connected by virtual fabric link (VFLs) that provide a connection for exchange of data packets between the network nodes. The data packets include source MAC addresses and associated hardware device information, such as source chassis ID, source network interface identifier and source port identifier information. The network nodes use this information to maintain synchronized MAC address tables for forwarding of data packets in the virtual chassis system. One or more control protocols in the network node are used for topology discovery, master network node election, generation of routing tables, health monitoring and other functions.

20 Claims, 15 Drawing Sheets

(56) References Cited

U.S. PATENT DOCUMENTS

| | | |
|---|---|---|
| 7,675,869 B1 | 3/2010 | Anker et al. |
| 8,705,353 B1* | 4/2014 | Reddy et al. ............... 370/230 |
| 2008/0310421 A1* | 12/2008 | Teisberg et al. .......... 370/395.53 |
| 2009/0116404 A1* | 5/2009 | Mahop et al. ............... 370/254 |
| 2009/0252173 A1 | 10/2009 | Sampath et al. |
| 2012/0039335 A1 | 2/2012 | Subramanian et al. |
| 2012/0275297 A1 | 11/2012 | Subramanian |
| 2013/0148491 A1* | 6/2013 | Jha et al. .................... 370/217 |

OTHER PUBLICATIONS

European Patent Office; International Search Report and Written Opinion; International Application No. PCT/US13/68629; Feb 14, 2014; pp. 1-15.

* cited by examiner

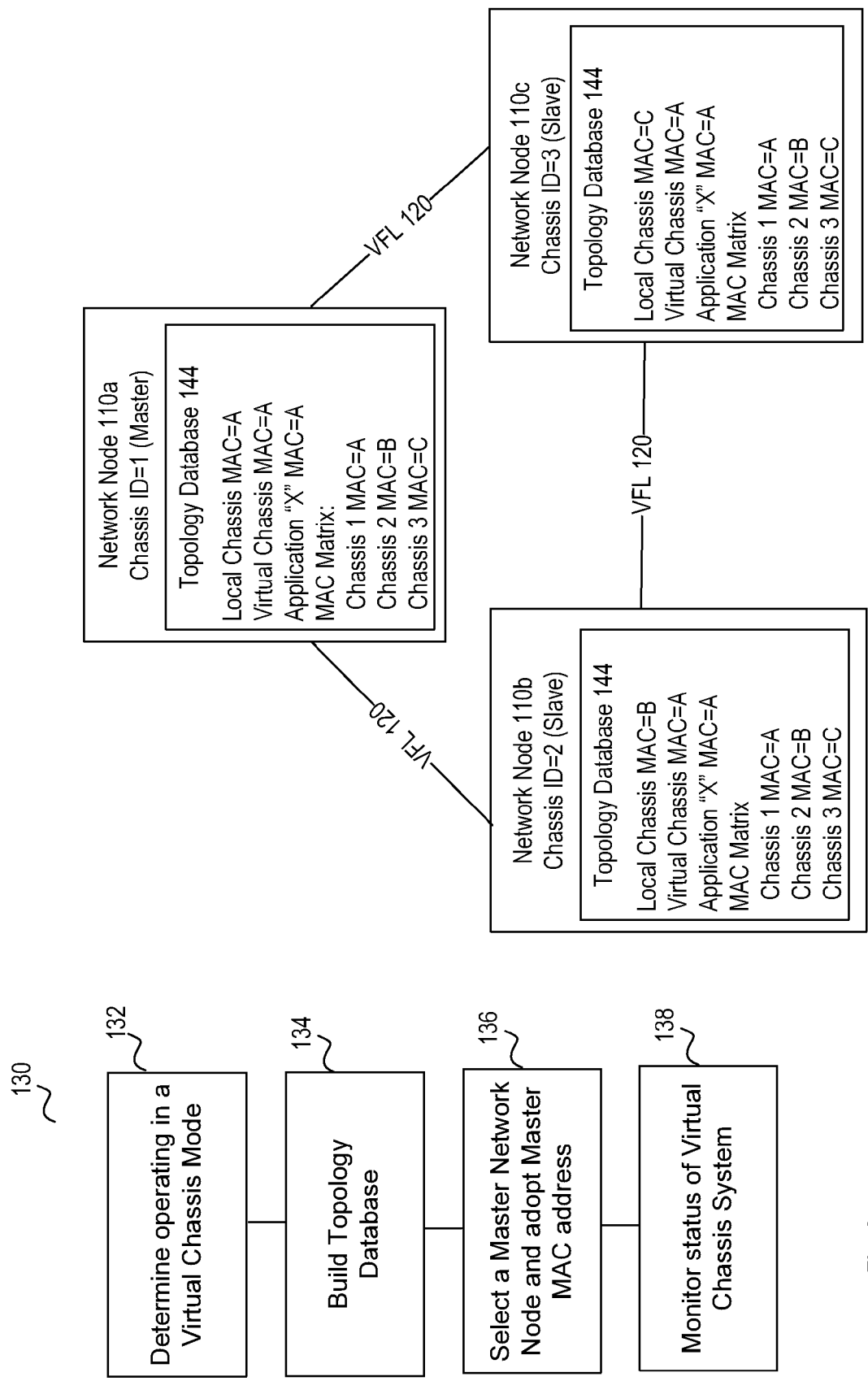

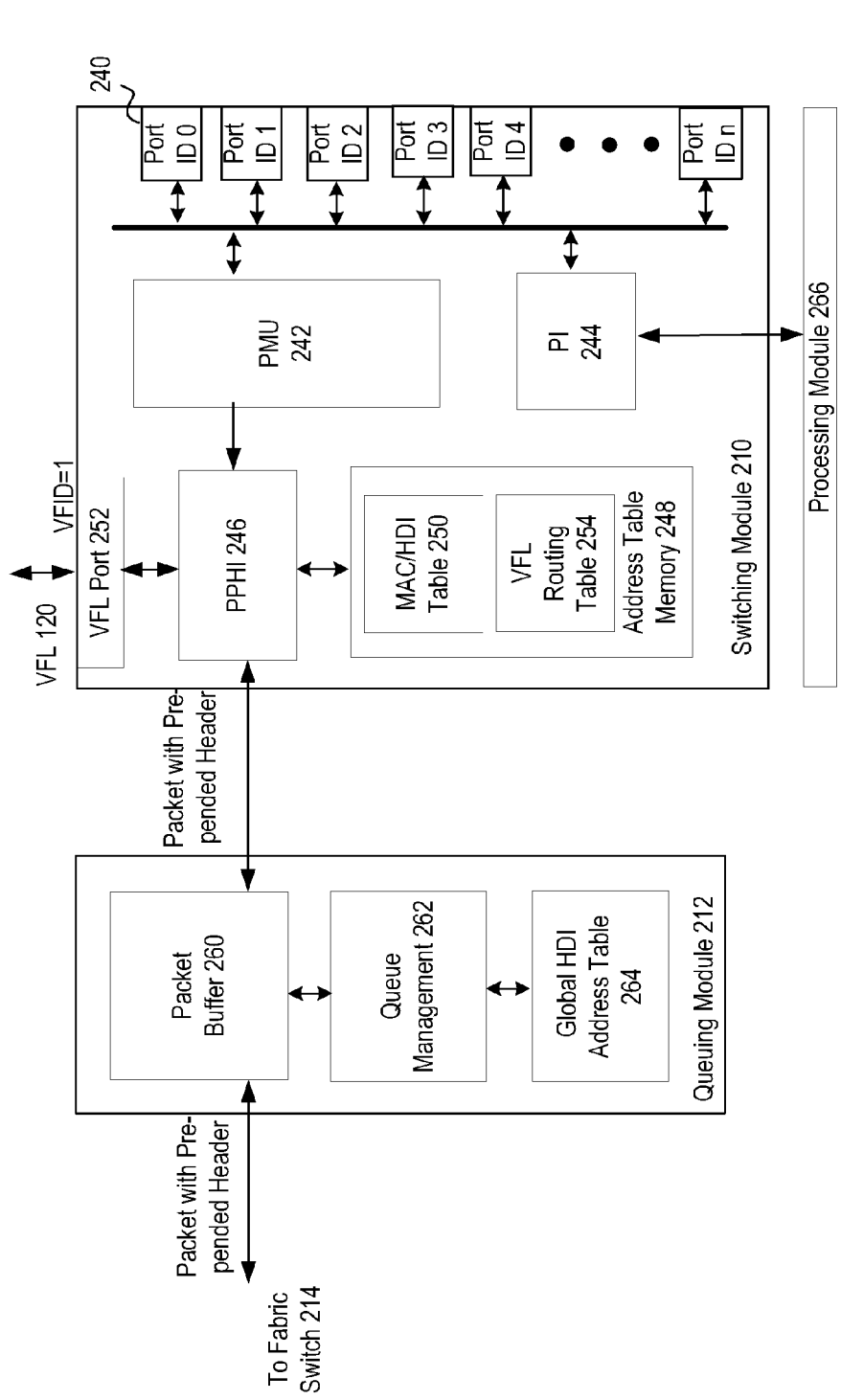

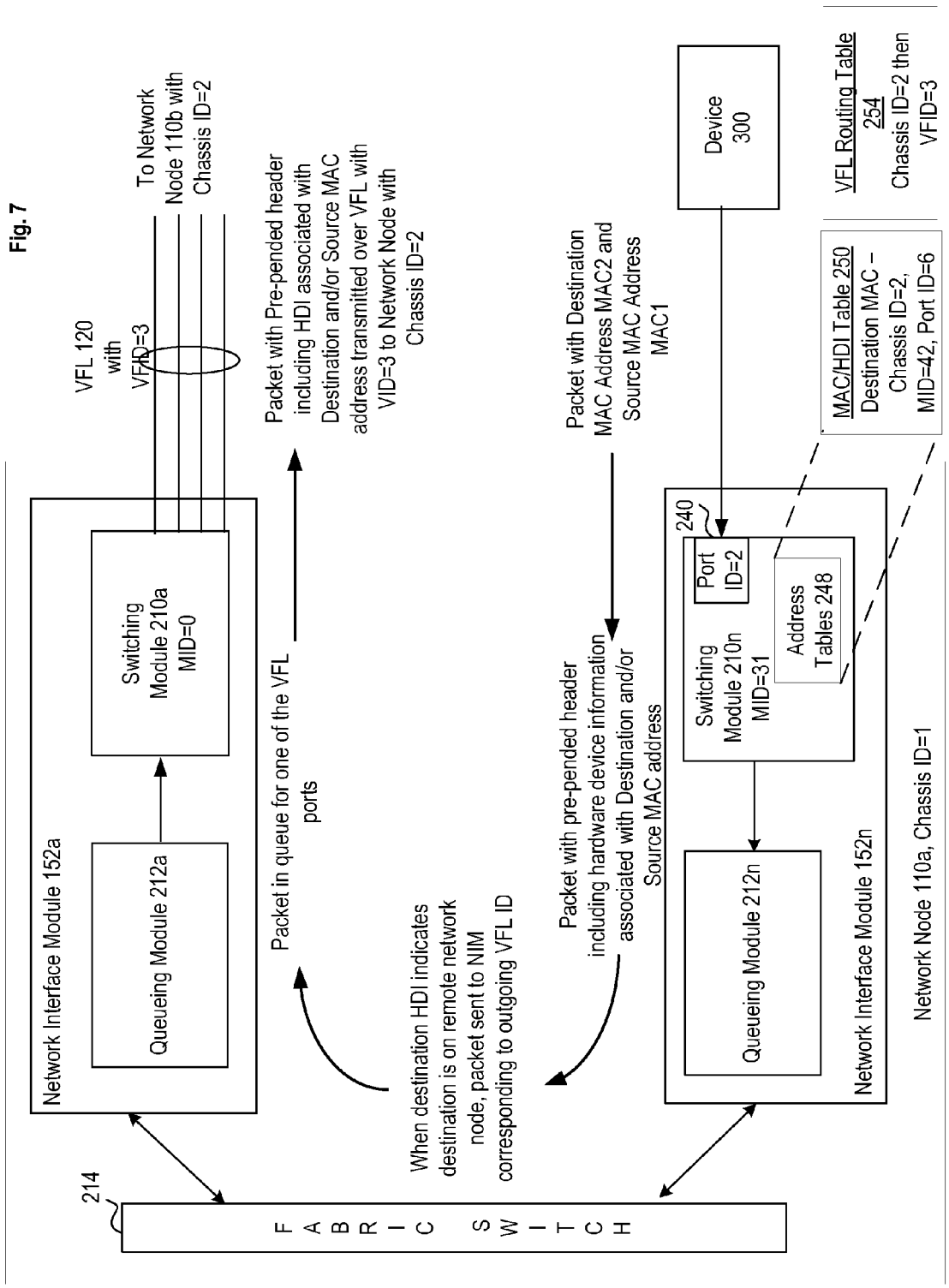

Routing Tree when Source of Non-Unicast Packet is Chassis ID=1

VIRTUAL CHASSIS SYSTEM CONTROL PROTOCOLS

CROSS-REFERENCE TO RELATED PATENTS

The present U.S. Utility Patent Application claims priority as a continuation in part pursuant to 35 U.S.C. §120 to U.S. patent application Ser. No. 13/010,168, entitled, "SYSTEM AND METHOD FOR MULTI-CHASSIS LINK AGGREGATION," filed Jan. 20, 2011, issued as U.S. Pat. No. 8,767,735, on Jul. 1, 2014, which is incorporated by reference herein and made part of the present U.S. Utility Patent Application for all purposes and which claims priority pursuant to 35 U.S.C. §119(e) to U.S. Provisional Application Ser. No. 61/370,622, entitled, "MULTICHASSIS VIRTUAL-FABRIC LINK AGGREGATION SYSTEM," filed Aug. 4, 2010, which is incorporated by reference herein and made part of the present U.S. Utility Patent Application for all purposes.

The present U.S. Utility Patent Application claims priority pursuant to 35 U.S.C. §119(e) to U.S. Provisional Application Ser. No. 61/658,159, entitled, "VIRTUAL CHASSIS WITH GENERIC NODE ARCHITECTURE AND TOPOLOGY," filed Jun. 11, 2012, which is incorporated by reference herein and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to data networks and in particular to systems and methods for providing topological redundancy and resiliency between nodes of one or more data networks.

2. Description of Related Art

Data networks include various computing devices, for example, personal computers, IP telephony devices or servers that communicate with each other and/or with various other network elements or remote servers attached to the network. For example, data networks may comprise, without limitation, Metro Ethernet or Enterprise Ethernet networks that support multiple applications including, for example, voice-over-IP (VoIP), data and video applications. Such networks regularly include interconnected nodes, commonly known as switches or routers, for routing traffic through the network.

One of the key challenges faced by data networks is the need for network resiliency, i.e., the ability to maintain high availability despite eventual component failures, link failures or the like, which is critical to providing satisfactory network performance. Network resiliency may be achieved in part through topological redundancy, i.e., by providing redundant nodes (and redundant components within nodes) and multiple physical paths between nodes to prevent single points of failure, and in part through L2/L3 protocols to exploit the redundancy upon occurrences of failures to converge upon alternate paths for switching/routing traffic flows through the network. As will be appreciated, detection and convergence times must occur quickly (advantageously, in less than one second) in networks to achieve seamless transition to the alternate paths. Various types of network topologies are implemented within a network to provide redundancy between network elements, such as a ring networks, partial mesh networks, full mesh networks, hub networks, etc. Convergence times and redundancy between network elements often varies depending on the type of network typology implemented in a network.

Architectures of network elements also vary and affect network resiliency. For example, various node architectures include single switching elements, stackable switching elements, multi-slot chassis based network elements, etc. In general, depending on cost and network needs, one of these types of node architectures is selected and implemented into one of the types of network topologies. However, once implemented, it is sometimes difficult to upgrade or transition from one type of network topology to another type of network topology. It is also difficult to transition from one type of node architecture to another type of node architecture within a network topology or to incorporate various types of node architectures within one network.

Accordingly, there is a need for systems and methods for providing resiliency between nodes having one or more different types of node architectures in one or more different types of network topologies.

BRIEF DESCRIPTION OF THE SEVERAL VIEWS OF THE DRAWINGS

FIG. 2 illustrates a logical flow diagram of an embodiment of a network topology discovery process in a virtual chassis system in accordance with the present invention;

FIG. 3 illustrates a schematic block diagram of an embodiment of topology database in a network node in a virtual chassis system in accordance with the present invention;

FIG. 5 illustrates a schematic block diagram of an embodiments of a network interface module of a network node in a virtual chassis system in accordance with the present invention;

FIG. 6 illustrates a schematic block diagram of an embodiment of a pre-pended header of a packet in the virtual chassis system in accordance with the present invention;

FIG. 7 illustrates a schematic block diagram of an embodiment of packet flow through a network node in a virtual chassis system in accordance with the present invention;

DETAILED DESCRIPTION OF THE INVENTION

The following standards are referred to in this application and are incorporated by reference herein: 1) the Link Aggregation Control Protocol (LACP) which was formerly clause 43 of the IEEE 802.3 standard added in March 2000 by the IEEE 802.3ad task force and is currently as incorporated in IEEE 802.1AX-2008 on Nov. 3, 2008; and 2) IEEE Std. 802.1Q, Virtual Bridged Local Area Networks, 2003 edition.

Figure 1A:
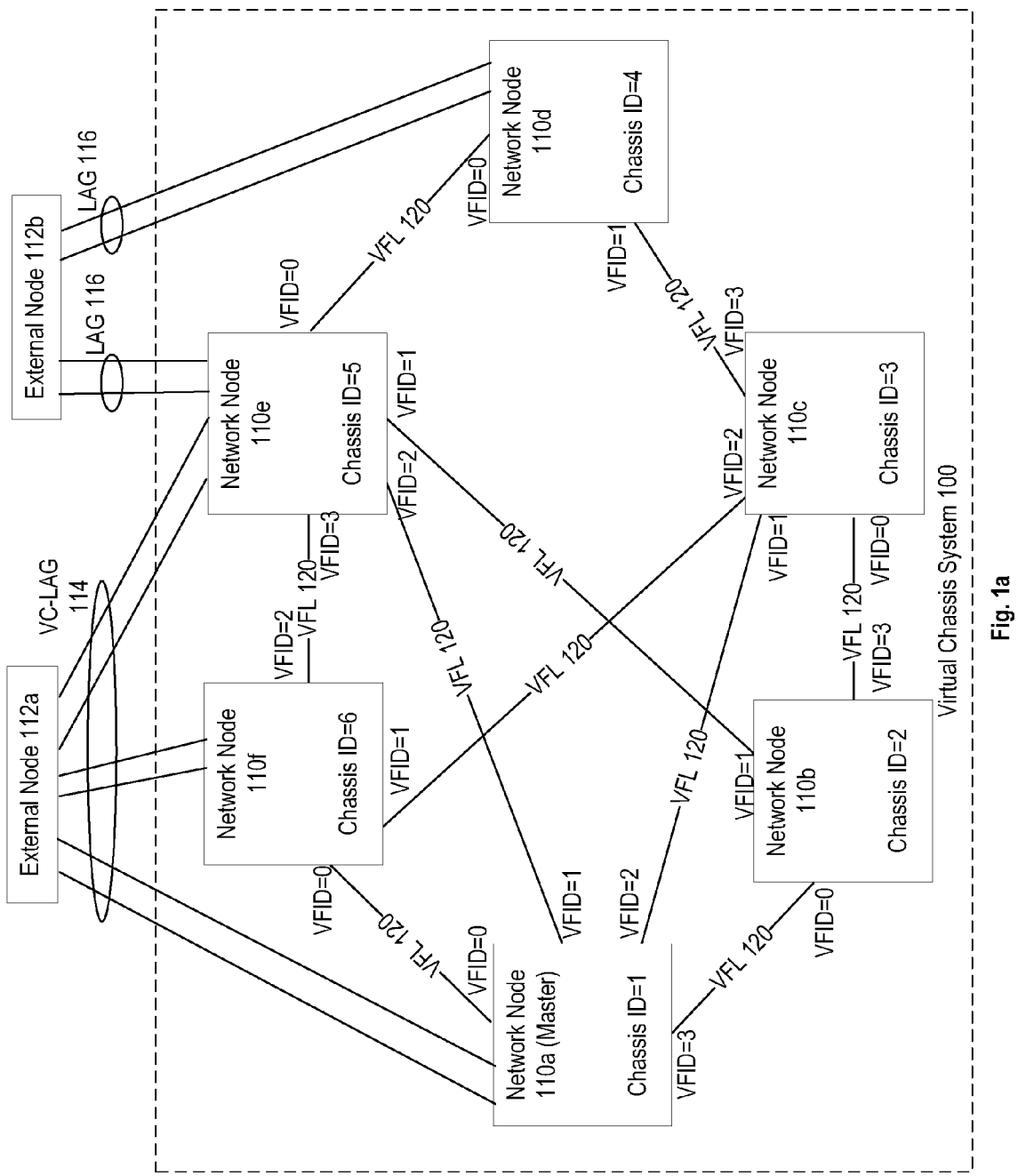
FIGS. 1a-c illustrate schematic block diagrams of embodiments of a virtual chassis system in accordance with the present invention.

FIG. 1a illustrates an embodiment of a virtual chassis system 100 including a plurality of network nodes 110 operably coupled by dedicated link aggregate groups for communicating control and addressing information called virtual fabric links (VFLs) 120. VFLs 120 and their operation are described in more detail in U.S. patent application Ser. No. 13/010,168, entitled, "SYSTEM AND METHOD FOR MULTI-CHASSIS LINK AGGREGATION," filed Jan. 20, 2011, now issued as U.S. Pat. No. 8,767,735, which is incorporated by reference herein and made part of the present U.S. Utility Patent Application for all purposes. The VFLs 120 provide connections between the network nodes 110 for exchange of information related to traffic forwarding, MAC addressing, multicast flows, address resolution protocol (ARP) tables, Layer 2 control protocols (e.g., spanning tree, Ethernet ring protection, logical link detection protocol), routing protocols (e.g. RIP, OSPF, BGP) and the status of the network nodes and external links.

In an embodiment, the plurality of network nodes 110 operate as a single virtual network node with unified management capabilities. A master network node, e.g. network node 110a, is selected and the local MAC address of the master network node 110 is adopted as the master MAC address for the virtual chassis system 100 by the other network nodes 110. The master MAC address is utilized by external nodes 112 to address the network nodes 110 in the virtual chassis system 100. As such, the network nodes 110 operate transparently to the external nodes 112 and are treated as a single logical device by the external nodes 112.

External nodes 112 are operable to couple to one or more network nodes 110 in the virtual chassis system 100 using a single trunk or link, a link aggregate group (LAG) 116 or virtual-chassis link aggregate groups (VC-LAG) 114. To provide increased resiliency and remove a single point or even two points of failure, VC-LAG 114 is operable to couple an external node to two or more network nodes 110 in the virtual chassis system 100. The external node can use load balancing techniques to distribute traffic across the available links of VC-LAG 114. For example, one of the physical links of the VC-LAG 114 is selected by the external node to transmit a packet based on a load-balancing algorithm (usually involving a hash function operating on the source and destination Internet Protocol (IP) or Media Access Control (MAC) address information) for a more effective use of bandwidth.

During normal operation, the network nodes 110 within the virtual-chassis system share the master MAC address for system identification by a wide variety of layer 2 and layer 3 protocols. For example, the spanning tree protocol and LACP protocols use the master MAC address as the identifier for the virtual chassis system 110. Internet Protocol (IP) routing also utilizes the master MAC address to identify the virtual chassis system 100 to external network elements in the network, e.g. peers use the master MAC address as the Ethernet destination address for packets destined to the virtual chassis system 100. As such, the network nodes 110 within the virtual chassis system 100 are viewed as a single logical node by external network nodes 112. In addition, the network nodes 110 within a virtual chassis system 100 are managed as a single node with a unified administration, operations and maintenance management system.

Since the network nodes 110 within a virtual chassis system 100 are treated as a single logical device by external nodes 112, the external nodes 112 are operable to actively forward traffic on all the links of the VC-LAG 114. This feature enables multiple homing of the external nodes 112 to the network nodes 110 without requiring spanning tree protocols between the external nodes and network nodes while still facilitating a carrier-grade detection and convergence time to edge uplink failures as well as network node 110 failures. Another advantage of the active forwarding mode of all the VC-LAG 114 uplinks to the virtual chassis system 100 is increased efficiency of the use of bandwidth of the VC-LAG 114 links.

Within the virtual chassis system 100, a network node 110 is assigned a globally unique identifier called a chassis identifier or chassis ID. The network node 110 assigns an internal VFL identifier (VFID) to each of its configured VFLs 120 within the virtual chassis system 100. Since the VFID for a VFL is utilized for internal identification and configuration of VFLs 120, a network node 110 may assign the same or a different VFID to a VFL 120 as assigned by another network node 110. The VFLs 120 provide a connection for exchange of information between the network nodes 110 regarding traffic forwarding, MAC addressing, multicast flows, address resolution protocol (ARP) tables, Layer 2 control protocols (e.g. spanning tree, Ethernet ring protection, logical link detection protocol), routing protocols (e.g. RIP, OSPF, BGP), as described in more detail in U.S. patent application Ser. No. 13/010,168, entitled, "SYSTEM AND METHOD FOR MULTI-CHASSIS LINK AGGREGATION," filed Jan. 20, 2011. In an embodiment, synchronization of layer 2 address tables, such as medium access control (MAC) address tables, between the network nodes 110 is driven by layer 2 packet flows over the VFLs 120 as well as by a periodic keep-alive mechanism whereby the network node 110 that owns a given MAC address floods specific packets bearing such MAC address as the source address. The synchronization mechanism also needs to implement the standard MAC flushing mechanism to handle cases where a network node 110 or some of its components go down. MAC address source learning is enabled over the VFLs 120 through flooding of unknown destination MAC addresses. During source learning, the network nodes 110 exchange packets with prepended headers over the VFLs 120 that include source MAC addresses and associated hardware device information, such as source chassis ID, source network interface identifier and source port identifier information. The network nodes 110 use this information to maintain synchronized MAC address tables with minimum messaging based MAC table synchronization. Utilizing the synchronized MAC address table, the network nodes 110 are operable to process and forward packets between the network nodes 110 in the virtual chassis system 100.

Figure 1B:
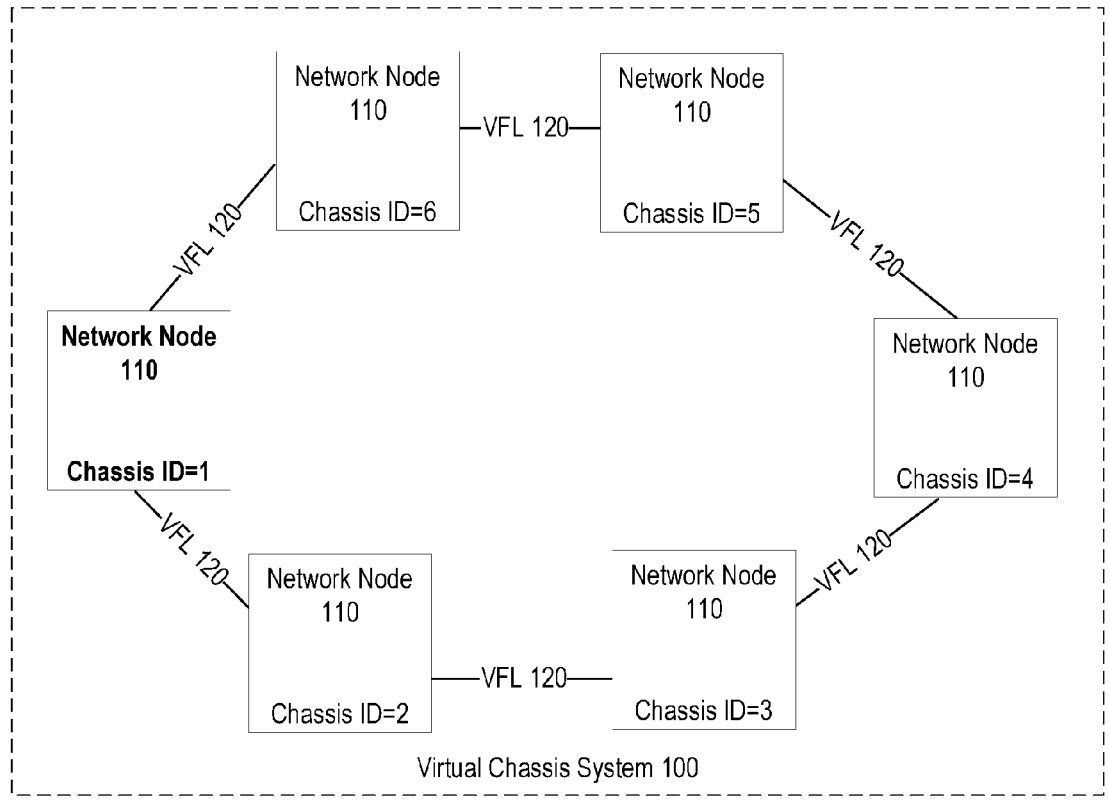
Figure 1C:
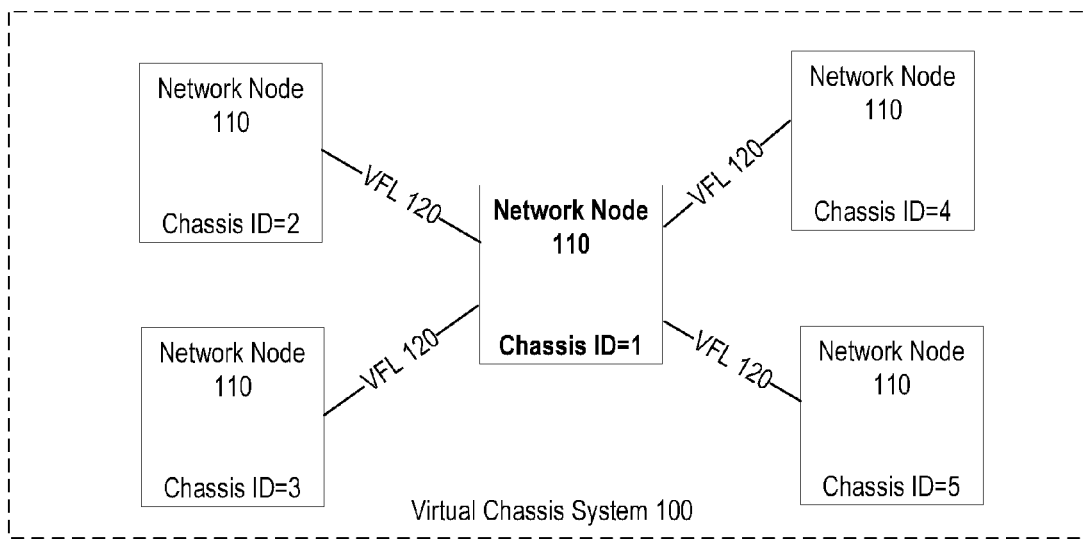

FIG. 1a illustrates that the network nodes 110 are coupled in a partial mesh network topology. However, the network nodes 110 in a virtual chassis system 100 may be coupled in any of a plurality of types of network topologies without affecting operation of the virtual chassis system 100. FIG. 1b illustrates a virtual chassis system 100 with a plurality of network nodes 110 configured in a ring network topology coupled by VFLs 120. FIG. 1c illustrates a virtual chassis system 100 with a plurality of network nodes 110 configured in a hub and spoke or star type network topology. Other network topologies not depicted, such as linear, tree, full mesh, hybrid, etc., are also be supported by the virtual chassis system 100. To support the plurality of different types of network topologies, the network nodes 110 in a virtual chassis system 100 are operable to perform a network topology discovery process.

FIG. 2 illustrates a logical flow diagram of an embodiment of a network topology discovery process 130 in a virtual chassis system 100. The process is performed by the active network nodes 110 in the virtual chassis system 100 at startup, reboot, on indication of a status change in the network or at predetermined time periods. In step 132, a network node 110 detects that it is operating in a virtual chassis mode. For example, one or more parameters of the network node 110 are configured to indicate a virtual chassis mode of operation. The network node 110 detects that the parameters indicate virtual chassis mode operation (e.g., rather than stand-alone mode or multi-chassis mode). The network node 110 then performs in step 134 one or more control protocols to discover other network nodes 110 in the virtual chassis system 100 and to exchange topology and configuration information. The network node 110 uses the information to build a topology database of the virtual chassis system 100. The topology database includes: identification information for the other network nodes 110 (e.g., local MAC address, chassis identifier), identification information for network interfaces that host active VFLs 120 (or other active inter-switch links), identification information for the VFLs 120 and their associated member ports on the network nodes 110. The network node 110 thus learns the active connections between the network nodes 110 and configuration information of the other network nodes 110 in the virtual chassis system 100. The following Table 1 is an example of a topology database for a network node 110a, in this example with e.g. chassis ID=1, following the discovery phase. Table 1 includes exemplary information stored in the topology database but other information and data not illustrated may also be included in the topology database. In addition, the topology database may be stored in separate databases or tables or combined with other tables or databases in the network node 110.

TABLE 1

| Topology Database - Chassis 1 | | | |
| --- | --- | --- | --- |
| Local Chassis Data | Neighbor [1] | Neighbor [2] | Neighbor [3] |
| Chassis ID = 1 | Chassis ID = 2 | Chassis ID = 4 | Chassis ID = 3 |
| Uptime = 4 min 50 sec | Uptime = 5 min 10 sec | Uptime = 5 min 5 sec | Uptime = 5 min 1 sec |
| Priority = 100 | Priority = 100 | Priority = 100 | Priority = 100 |
| Chassis MAC = A | Chassis MAC = B | Chassis MAC = D | Chassis MAC = C |
| Chassis Group = 0 | Chassis Group = 0 | Chassis Group = 0 | Chassis Group = 0 |
| Primary CMM = CMM-A | Primary CMM = CMM-A | Primary CMM = CMM-B | Primary CMM = CMM-A |
| Chassis type = OS10K | Chassis type = OS10K | Chassis type = OS10K | Chassis type = OS10K |
| Role = unassigned | Role = unassigned | Role = unassigned | Role = unassigned |
| State = unassigned | State = unassigned | State = unassigned | State = unassigned |

In step 136 of FIG. 2, a master network node is selected to perform management and other tasks for the virtual chassis system 100. The local MAC address of the master network node is then adopted by the other network nodes 110. The following Table 2 is an example of a topology database for the elected master network node 110 with chassis ID=1. As seen in Table 2, network node with chassis ID=1 is indicated as having the master role and the other nodes are indicated as having a slave role in the topology database.

TABLE 2

| Topology Database - Chassis 1 | | | |
| --- | --- | --- | --- |
| Local Chassis Data | Neighbor [1] | Neighbor [2] | Neighbor [3] |
| Chassis ID = 1 | Chassis ID = 2 | Chassis ID = 4 | Chassis ID = 3 |
| Uptime = 5 min 50 sec | Uptime = 6 min 10 sec | Uptime = 6 min 5 sec | Uptime = 6 min 1 sec |
| Priority = 100 | Priority = 100 | Priority = 100 | Priority = 100 |
| Chassis MAC = A | Chassis MAC = B | Chassis MAC = D | Chassis MAC = C |
| Chassis Group = 0 | Chassis Group = 0 | Chassis Group = 0 | Chassis Group = 0 |
| Primary CMM = CMM-A | Primary CMM = CMM-A | Primary CMM = CMM-B | Primary CMM = CMM-A |
| Chassis type = OS10K | Chassis type = OS10K | Chassis type = OS10K | Chassis type = OS10K |

TABLE 2-continued

Topology Database - Chassis 1

| Local Chassis Data | Neighbor [1] | Neighbor [2] | Neighbor [3] |
| --- | --- | --- | --- |
| Role = master<br>State = running | Role = slave<br>State = running | Role = slave<br>State = running | Role = slave<br>State = running |

The selection of a master network node 110 is based on a prioritized list of parameters including chassis priority, up time, chassis ID and chassis MAC address. The parameter of up time gives priority to network nodes 110 in operation for longer periods of time. The parameter of chassis priority is a user configured priority that defines the user preference of a master network node 110 regardless of chassis ID or up time. The use of various parameters adds flexibility to the selection of a master network node 110. The chassis group parameter shown in the topology database identifies the virtual chassis system 100. One or more additional virtual chassis systems 100 with different chassis group identifications may also be operable in a network. The topology database also identifies the active or primary control manager modules (CMM) in a network node 110 and the chassis type of the network node 110.

In step 138 of the network topology discovery process 130, the network node 110 performs one or more protocols to monitor the state or status of the connections and the network nodes 110 in the virtual chassis system 100. The current state of the network nodes 110 is maintained in the topology database. A detected status change in a network node 110 in the virtual chassis system 100 may initiate a change in routing, a change in the master node, etc. Through topology self-discovery and monitoring of the network nodes 110, the virtual chassis system 100 is operable to support a plurality of different types of network topologies with minimum pre-configuration and intervention.

FIG. 3 illustrates an example of topology databases 144 in network nodes 110 in a virtual chassis system 100 after selection of a master network node 110. In this example, network node 110a is adopted as the master network node and network nodes 110b and 110c are slave nodes. The local MAC address of network node 110a (e.g., master MAC address=A) is adopted by the network nodes 110a-c as the virtual chassis MAC address. In addition, the master MAC address (MAC=A) is adopted as the application MAC address for management applications.

Figure 4:
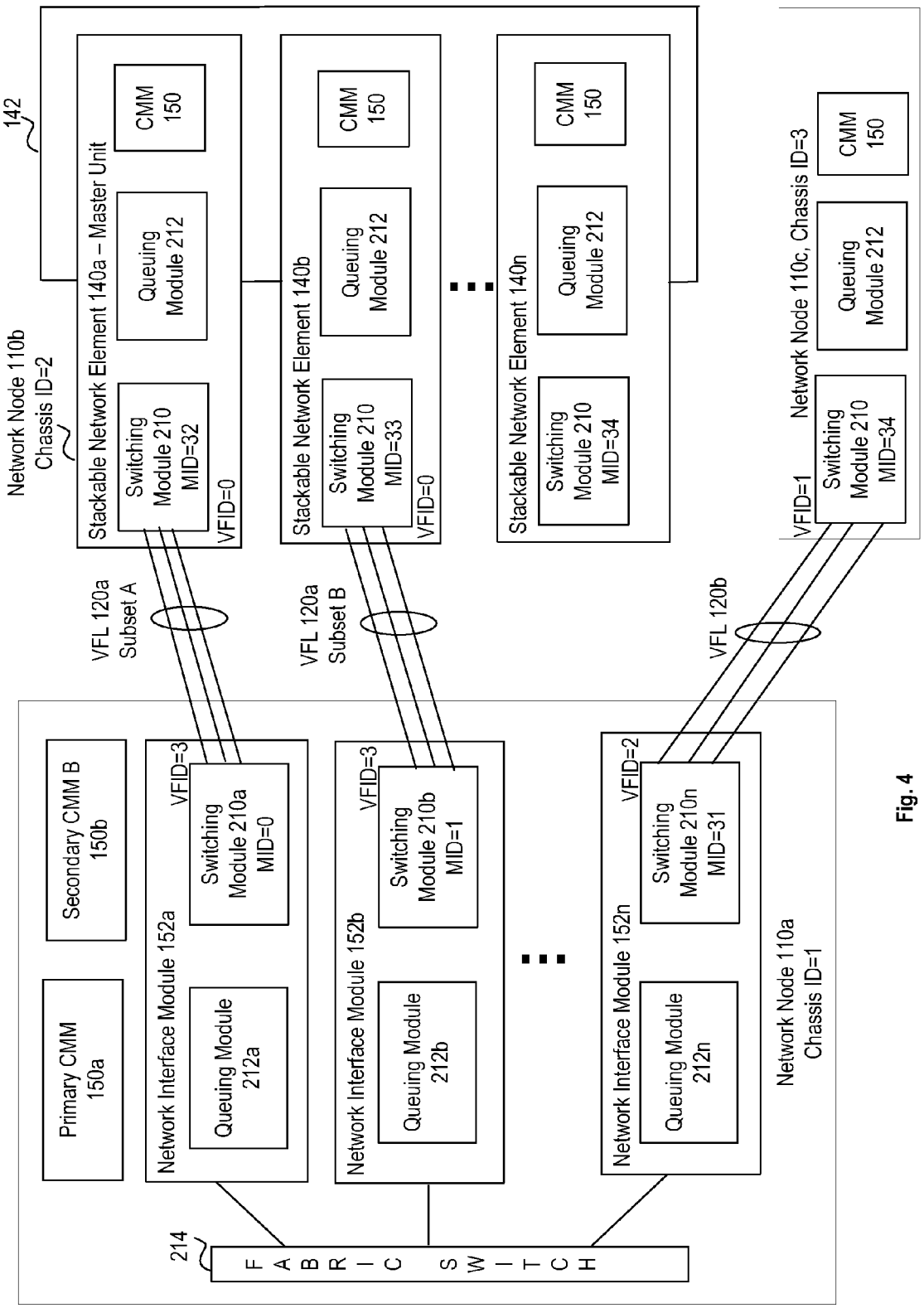
FIG. 4 illustrates a schematic block diagram of an embodiment of network nodes in a virtual chassis system in accordance with the present invention.

The virtual chassis system 100 is also operable to include network nodes 110 with one or more different types of node architectures, such as single module, stackable, or multi-slot chassis-based architectures. FIG. 4 illustrates a schematic block diagram of an embodiment of network nodes 110 in a virtual chassis system 100 with different types of node architectures. In this example, network node 110a has a multi-slot chassis-based architecture with a plurality of network interface modules 152a-n. In general, multi-slot chassis-based architectures share one enclosure, control manager modules (CMMs) 150a-b and a common power supply with one or more network interface modules (NIMs) 152a-n, such as line cards or port modules. The network interface modules 152n include a queuing module 212 and switching module 210 and are connected by a fabric switch 214 integrated into the backplane of the chassis.

Network node 110b in this example has a stackable node architecture and includes a plurality of network elements 140a-n coupled by backplane connections 142. Each network element 140a-n is operable as a stand-alone node and includes its own enclosure, control manager module (CMM) 150, switching module 210, queuing module 212 and power supply. In some stack architectures, one network element (Network Element 140a in this example) is designated as the main or master unit of the stack for management purposes.

Network node 110c has a single module node architecture, such as a single stackable element 140 or alternatively, a multi-slot chassis-based architecture with a single network interface module 152.

Network nodes 110a-c correspond to one or more of the network elements 110 in virtual chassis system 100 in FIGS. 1a-c. For example, virtual chassis system 100 is operable to include network nodes 110 with only multi-slot chassis-based node architectures or include network nodes 110 with only stackable node architectures or include a combination of network nodes 110 with two or more types of node architectures, such as multi-slot chassis-based architectures, stackable node architectures and single module node architectures. Though not shown, the virtual chassis system 100 may also include network nodes 110 comprised of other types of node architectures and configurations.

Network node 110a and network node 110b are operably coupled by VFL 120a. The network nodes 110a and 110b designate VFL 120a with an internal VFL identifier (VFID), such as VFID=3 for network node 110a and VFID=0 by network node 110b as shown in FIG. 3. Network node 110a and network node 110c are operably coupled by VFL 120b. The network nodes 110a and 110c designate VFL 120b with an internal VFL identifier (VFID), such as VFID=2 for network node 110a and VFID=1 by network node 110c as shown in FIG. 3. In addition, the network nodes 110a-c are also operable to be coupled by additional VFL 120s to one or more other network nodes 110 as shown in FIGS. 1a-c. The VFL 120a between network nodes 110a and 110b is described below as a generalization of the operation and configuration of the VFLs 120 between the various network nodes 110 in a virtual chassis system 100.

VFL 120a between network node 110a and network node 110b is operably coupled to one or more VFL member ports in one or more switching modules 210. For redundancy in case of failure of one or more ports, links or modules, VFL 120a is operable to include a plurality of aggregate links generated using the LACP or similar aggregate protocol between different switching modules 210 of the network nodes 110a and 110b. For example, in FIG. 4, VFL 120a includes a first subset A of physical links between NIM 152a of network node 110a and stackable network element 140a of network node 110b and a second subset B of physical links between NIM 152b of network node 110a and stackable network element 140b of network node 110b.

The network nodes 110 are assigned a unique chassis identifier in the virtual chassis system 100. The chassis ID for each network node 110 is unique and global and through the topology discovery, the network nodes 110 are aware of the chassis ID of its peer network nodes 110 in the virtual chassis system 100. In addition, unique hardware device identifiers or module identifiers (MIDs) for various components, such as the switching modules 210 and port interfaces in the network nodes 110, are generated allowing for management of local and remote objects. In an embodiment, the hardware device identifiers MIDs for the switching modules 210 have global significance within the virtual chassis system while MIDs for other components, such as queuing modules 212, may have only local significance. For example, the hardware device identifiers' assigned to the switching modules 210 are known by other network nodes 110 while hardware device identifiers for other devices are restricted to a local network node 110 and have no significance to other network nodes 110. For example, the port interfaces of a switching module 210 are assigned a global unique hardware device identifier that includes the chassis ID, switching module ID and port interface ID. In an embodiment, the network nodes 110 in the virtual chassis system operate in a pre-pended header mode to exchange data and control packets over the VFLs 120.

FIG. 5 illustrates a schematic block diagram of an embodiment of a network interface module (NIM) 152 operating in a prepended header mode in more detail. Though a network interface module 152 is illustrated, a stackable network element 140 or single module network element is operable to perform similar functions for operating in a prepended header mode. Switching module 210 includes a plurality of external ports 240 that are connected to external nodes 112 from the virtual chassis system 100. One or more of the external ports 240 may include member ports for a VC-LAG 114, LAG 116, single trunk or other trunk group, fixed link, etc. The external ports 240 may have the same physical interface type, such as copper ports (CAT-5E/CAT-6), multi-mode fiber ports (SX) or single-mode fiber ports (LX). In another embodiment, the external ports 240 may have one or more different physical interface types.

The external ports 240 are assigned external port interface identifiers (Port ID), e.g., device port values, such as gport and dport values, associated with the switching module 210. In an embodiment, the chassis ID of the network node 110, the MID of the switching module 210 and the external port interface identifier (Port ID) are used as a global unique identifier of a physical external port interface 240 in a network node 110 in the virtual chassis system 100. In another embodiment, globally unique module identifiers (MID) are assigned to the switching modules 210 of the network nodes in the virtual chassis system based on the chassis identifiers. For example, switching MIDs 0-31 are assigned to chassis ID=1, switching MIDs 32-63 are assigned to chassis ID=2, etc. In this case, the globally unique switching MIDs and external port identifiers (Port ID) are used as a global unique identifier of a physical external port interface 240 in a network node 110 in the virtual chassis system 100.

When a packet is received on an external port 240, switching module 210 transfers the packet to a pre-pended packet header interface (PPHI) 246 that adds a pre-pended header (or otherwise modifies the packet header) to include hardware device information (HDI) associated with the source and/or destination MAC address of the packet. In an embodiment, the pre-pended header may include other information such as packet priority and load balance identifiers. To obtain HDI information associated with the MAC address of the packet, the PPHI performs a look-up process in MAC/HDI forwarding table 250. The MAC/HDI forwarding table 250 stored in the address table memory 248 includes a list of MAC addresses and associated hardware device information. The hardware device information uniquely identifies a network node 110, switching module 210 and/or a port interface 240 for routing the packet. The hardware device information includes, for example, chassis ID, MID of a switching module 210 and/or port interface ID of a port 240 associated with the destination MAC address. The MAC/HDI forwarding table 250 may include one or more tables, such as source trunk map, trunk bitmap table, trunk group tables, VLAN mapping table, etc. In an embodiment, the MAC/HDI forwarding table 250 or parts thereof may be located in the queuing module of the NIM 152 or other module as well.

Based on the topology database 144, a VFL routing configuration table 254 is generated at a network node 110 to determine routing of unicast traffic. The VFL routing configuration table 254 includes a chassis ID and an associated VFL ID (VFID). The VFID associated with the chassis ID identifies a VFL 120 in the virtual chassis system 100 for routing the packet to a network node 110 identified by the destination chassis ID. In another embodiment, when globally unique module identifiers (MID) are assigned to the switching modules 210 of the network nodes 110 in the virtual chassis system 100, the VFL routing configuration table 254 includes the globally unique MIDs and an associated VFL ID (VFID). In an embodiment, the VFL routing configuration table 254 is generated using a shortest path algorithm, traffic based algorithm or other type of routing algorithm. An example of VFL routing configuration tables 254 for the virtual chassis system 100 shown in FIG. 1a is illustrated below in Table 3.

TABLE 3

VFL Routing

| Destination Chassis ID/MID | Outgoing VFL ID |
|---|---|
| Configuration on Chassis 1 | |
| 1 (MID = 0-31) | N/A (local) |
| 2 (MID = 32-63) | 3 |
| 3 (MID = 64) | 2 |
| 4 (MID = 65-97) | 2 or 1 |
| 5 (MID = 98) | 1 |
| 6 (MID = 99-115) | 0 |
| Configuraton on Chassis 2 | |
| 1 (MID = 0-31) | 0 |
| 2 (MID = 32-63) | N/A (local) |
| 3 (MID = 64) | 3 |
| 4 (MID = 65-97) | 3 or 1 |
| 5 (MID = 98) | 1 |
| 6 (MID = 99-115) | 0 or 1 |
| Configuration on Chassis 3 | |
| 1 (MID = 0-31) | 1 |
| 2 (MID = 32-63) | 0 |
| 3 (MID = 64) | N/A (local) |
| 4 (MID = 65-97) | 3 |
| 5 (MID = 98) | 3 or 2 |
| 6 (MID = 99-115) | 2 |
| Configuration of Chassis 4 | |
| 1 (MID = 0-31) | 0 or 1 |
| 2 (MID = 32-63) | 0 or 1 |
| 3 (MID = 64) | 1 |
| 4 (MID = 65-97) | N/A (local) |
| 5 (MID = 98) | 0 |
| 6 (MID = 99-115) | 0 or 1 |
| Configuration on Chassis 5 | |
| 1 (MID = 0-31) | 2 |
| 2 (MID = 32-63) | 1 |
| 3 (MID = 64) | 1 or 0 |
| 4 (MID = 65-97) | 0 |
| 5 (MID = 98) | N/A (local) |
| 6 (MID = 99-115) | 1 |
| Configuration on Chassis 6 | |
| 1 (MID = 0-31) | 0 |
| 2 (MID = 32-63) | 0 or 1 |

TABLE 3-continued

VFL Routing

| Destination Chassis ID/MID | Outgoing VFL ID |
| --- | --- |
| 3 (MID = 64) | 1 |
| 4 (MID = 65-97) | 1 or 2 |
| 5 (MID = 98) | 2 |
| 6 (MID = 99-115) | N/A (local) |

Though the MAC/HDI forwarding table 250 and VFL routing table 254 are illustrated as separate tables in address table memory 248, the tables may be combined or data included from one of the tables into the other table or the tables may be separated into one or more other tables.

In an embodiment, the hardware device information HDI in the pre-pended header of a packet includes the outgoing VFID for the VFL port 252 associated with the destination chassis ID, as shown in Table 3. The pre-pended header also includes hardware device information HDI associated with the source port receiving the packet, such as the port interface ID, MID of the switching module 210 and chassis ID. Additional information, such as VLAN ID, packet type (multicast, unicast, broadcast), packet priority and load balance identifier is also added to the pre-pended header in an embodiment.

The packet with the pre-pended header is then transmitted to the queuing module 212 for routing over the fabric switch 214. Based on the VFL routing configuration table 254, the queuing module 212 routes the packet with the pre-pended header to the switching module 210 connected to the outgoing VFL 120.

The queuing module 212 includes a packet buffer 260, a queue management 262 for providing traffic and buffer management and a global HDI address table 264. The global HDI address table 264 maps the outgoing VFL ID to the appropriate queues in queuing modules 212 in one or more of the other NIMs 152. For example, the queuing module 212 switches the packet to an appropriate egress queue for one or more of the VFL port interfaces 252 for transmission over the outgoing VFL 120. In an embodiment, a determination of the egress queue corresponding to a particular VFL port interface is operably based on a load balance identifier in the pre-pended header.

Though the switching module 210 and queuing module 212 are illustrated as separate integrated circuits or modules, one or more functions or components of the modules may be included on the other module or combined into an alternate module or otherwise be implemented in one or more integrated circuits.

FIG. 6 illustrates a schematic block diagram of an embodiment of a pre-pended header of a packet in the virtual chassis system 100. The pre-pended header 300 includes fields for source HDI 302, destination HDI 304, VLAN ID 306, packet type 308, source MAC address 310 and destination MAC address 312. In an embodiment, the pre-pended header may also include, load balance identifier 314 and packet priority 316. The destination HDI 304 includes, for example, the port identifier (either device port (dport) and/or global port value (GPV)), MID of switching module 210 and/or chassis ID of the destination network node 110 associated with the destination MAC address. The source HDI 302 includes, for example, the port identifier (either device port (dport) and/or global port value (GPV)), MID of switching module 210 and/or chassis ID of the source network node associated with the source MAC address. The load balance identifier 314 is utilized by the queuing module 212 to determine a VFL member port for transmission of the packet over the outgoing VFL 120. The packet priority 316 is utilized by the queuing module 212 to determine the specific priority queue.

FIG. 7 illustrates a schematic block diagram of an embodiment of a packet flow through a network node 110a to another network node 110b in a virtual chassis system 100. In this example, an external device 300 from the virtual chassis system 100 with source MAC address "MAC1" transmits a packet with a destination MAC address "MAC2". Network node 110a, with Chassis ID=1 in this example, receives the packet at external port interface 240, e.g. with port ID=2 on switching module 210n, e.g. with MID=31. The switching module 210n extracts the destination MAC address MAC2 and performs an address table look-up in MAC/HDI forwarding table 250 to determine hardware device information (HDI) associated with the destination MAC address MAC2. The destination HDI may include, e.g., destination chassis ID and device module identifier (MIDs) and port identifiers associated with the destination MAC address. The destination HDI may also include identifiers of one or more other network nodes or hardware modules in a path to the destination device associated with the destination MAC address. When the destination MAC address is associated with another network node, e.g. destination chassis ID is not the local chassis ID, the switching module 210 determines an outgoing VFL ID associated with the destination chassis ID. The outgoing VFL ID may be added to the destination HDI in the pre-pended header. For the example in FIG. 5, the VFL routing table 254 indicates that the destination chassis ID=2 is associated with VFL 120 having VFID=3.

The switching module 210n also includes in the prepended header source hardware device information (HDI) associated with the originating external port interface, e.g. port ID=2. The source HDI may include one or more hardware device identifiers, such as MID of the originating switching module 210, source port identifier, MID for source NIM 152, source chassis ID, etc. Furthermore, in an embodiment, the pre-pended header includes a packet priority and a load balance identifier determined based on parameters retrieved from the original packet (source MAC address, destination MAC address, source IP address, destination IP address).

The packet with pre-pended header is transmitted to the queuing module 212n which then determines a NIM 152 on the network node 110 to transmit the packet based on the destination HDI. When the destination HDI indicates a local external port interface on the network node (e.g. based on the destination MID contained in the pre-pended header), the queuing module places the packet in an egress queue for transmission to the corresponding NIM 152 of the local external port interface. In another example illustrated in FIG. 5, when the destination HDI indicates that the packet needs to be transmitted over a VFL 120 to another network node 110 in the virtual chassis system 100, the queuing module determines from the VFL ID the outgoing NIM 152 to transmit the packet. In this example, the queuing module determines that VFID=3 is operably coupled to NIM 152a and transmits the packet with pre-pended header over the fabric switch 214 to NIM 152a. When multiple switching modules 210 are operably coupled to the outgoing VFL 120, the traffic to be transmitted may be distributed between the multiple switching modules 210 in a load balancing method. In addition, the selection of a VFL member port (high priority queue, low priority, etc.) on a switching module 210 is operably based on load balance identifier parameters carried on the pre-pended header. The queuing module 212a on NIM 152a receives the packet with pre-pended header and queues the packet for transmission over VFL 120 with VFID=3. The switching module 210a then transmits the packet with pre-pended header including the source and/or destination HDI to the network node 110b, chassis ID=2 over the VFL 120 with VFID=3.

In an embodiment, the switching module 210a may alter the pre-pended header prior to transmission over the VFL 120. For example, the switching module 210a may translate a destination HDI with local significance (e.g., a gport value or local hardware device identifier MID) to an HDI with global significance or remove the outgoing VFID from the pre-pended header.

In an embodiment, the MAC/HDI forwarding tables 250 in the NIMs 152 are populated and updated in response to layer 2 packet flows through the virtual chassis system 100. Since the pre-pended header includes source MAC address and source HDI information, the NIMS 152, e.g. in specific the switching modules 210 in an embodiment, are able to populate the MAC/HDI forwarding table 250 with this information. By operating in a pre-pended header mode to exchange Layer 2 packets with source MAC addresses and source HDI over the VFL 120, the switching modules 210 are able to synchronize the MAC/HDI forwarding tables 250 between the network modules 110 in a virtual chassis system 100. Though the MAC/HDI forwarding table 250 and VFL routing table 254 are described as located in the switching modules 210, the tables may be included, alternatively or in addition to, in the queuing modules 212n or other module of the network node 110. In another embodiment, the CMM 150 (primary and secondary) may also include the MAC/HDI forwarding table 250 and VFL routing table 254.

Figure 8:
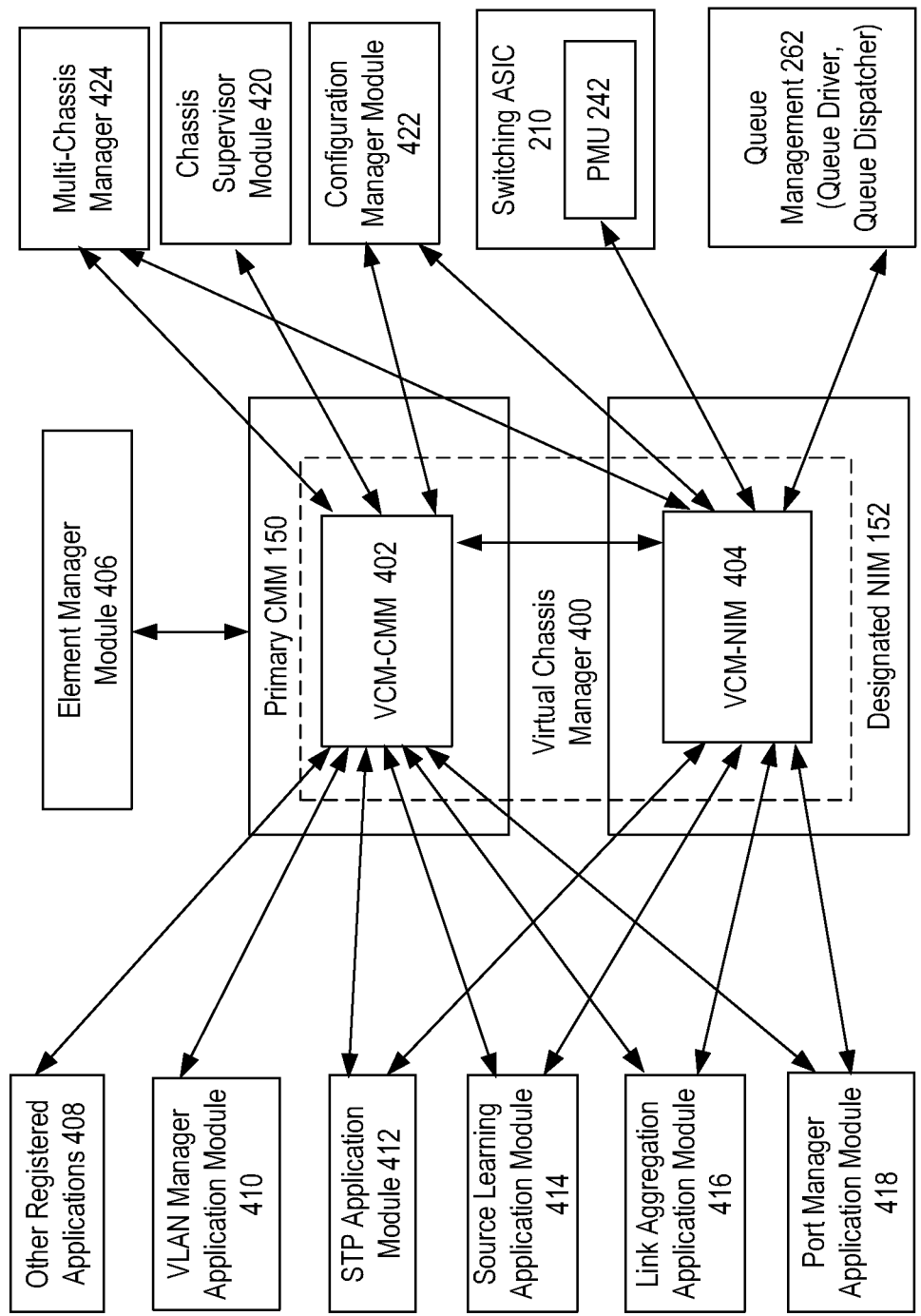
FIG. 8 illustrates a schematic block diagram of an embodiment of a virtual chassis manager application in accordance with the present invention.

FIG. 8 illustrates a schematic block diagram of an embodiment of a virtual chassis manager application or module 400 operable in the network nodes 110 in the virtual chassis system 100. In an embodiment of a network node 110 with a multi-slot chassis based node architecture, the virtual chassis manager module 400 includes a distribution of functionality between the central management module (CMM) 150 of the network node 110 (called VCM-CMM 402) and a processing module 266 in a designated network interface module (NIM) 152 of the network node (called VCM-NIM 404). In a stackable node architecture, a designated or master stackable network element 140 operates the VCM-NIM 404. Use of a designated NIM 152 or stackable element 140 avoids centralizing the functions of the VCM module 400 only at a CMM 150. An example of a distribution of functionality of the virtual chassis manager module 400 is shown in Table 4.

the virtual chassis manager module 400 provides a wide range of notifications to inform interested applications about the status of the virtual chassis system both in the context of the local node and other network nodes 110 in the virtual chassis system 100. Some of the status information is driven by management configuration, whereas other status information is triggered by runtime decisions taken by the network node individually or by a plurality of the network nodes 110 within the virtual chassis system upon control data exchange, negotiation and agreement. The virtual chassis manager module 400 also interfaces with the VLAN Manager Application module 410, Spanning Tree Protocol (STP) application module 412, Source Learning application module 414, Link Aggregation application module 416 and Port Manager application module 418 for the purposes of requesting services from these system components. For example, the VCM 400 may request VLAN Manager to configure a VFL member port as a member of the control VLAN in order to allow the set-up of an inter-process communication channel between the network nodes 110 in the virtual chassis system 100.

The VCM-NIM 404 performs module identification configuration (e.g. MID) of hardware modules. The VCM-NIM 404 also interfaces with the queue management 262 in queuing modules 212 to perform hardware device/queue mapping functions and inter-chassis loop avoidance functions. The VCM-NIM 404 also includes virtual chassis state functionality for the control and management of the VFLs 120. Virtual Fabric Link Control manages and configures the VFLs 120 and interfaces with the port manager application module 418 to monitor and/or control the state of the VFLs 120 and their corresponding member ports. It also tracks and updates the status of the VFLs 120. The VCM-NIM 404 tracks the state of each VFL member port using the standard LACP protocol, or other similar protocol, along with the state of the link at the physical level. In addition to the LACP protocol, a virtual chassis status protocol performs periodic keep-alive checks (hello protocol) in order to check the status and/or operability of components running on the designated NIM on both virtual-chassis switches. All virtual chassis protocol packets must be assigned a high priority in the system to avoid false/premature failure detection because such a premature detection of failure may have a very disruptive effect in the system. By running the virtual chassis status protocol on a primary designated NIM 152, the back-up designated NIM module is able to assume control of the status protocol processing in the event of failure.

TABLE 4

| VCM-CMM 402 | VCM-NIM 404 |
|---|---|
| Element and network management interface to the virtual chassis functionality Coordination of the virtual chassis operation and states from a network node overview | Control protocol state machines Service interfaces with other software components, i.e. interfaces used by the VCM module 400 to provide or request services to/from other software components. Programming of the underlying switching module devices: global module identifiers (MID), loop prevention, virtual chassis inter-process communication infrastructure, VFL member port programming, etc. |

In an embodiment, the VCM-CMM 402 includes an interface between the virtual chassis manager module 400 and element and/or network manager module 406 as well as an interface to other applications 408 registered with VCM module 400 operable on the network node 110. The virtual chassis manager module 400 informs the registered applications 408 when to operate in the virtual chassis mode. More generally, The VCM-CMM 402 and the VCM-NIM 404 register with port manager application module 418 to receive port state and link state events about the member ports and links of the VFLs 120. In another embodiment, the virtual chassis manager module 400 may include a port manager application module to monitor the port and link state of the VFLs 120. The virtual chassis manager module 400 tracks the operational state of VFLs 120 and processes events about the VFL status, i.e. aggregate created/deleted/up/down. The port manager application module 418 provides link state notifications to both the VCM-CMM 402 and VCM-NIM 404.

In an embodiment, a transport control protocol is implemented in a virtual chassis system 100 to transport control protocol packets between designated NIMs 152 or stackable network elements 140 of network nodes 110. The transport control protocol is operable in the network nodes 110 with different node architectures. For a multi-slot chassis based node architecture, a designated NIM 152 with a designated processing module 266 operates the transport control protocol, e.g. as part of the VCM-NIM 404. In a stackable node architecture, a designated or master stackable network element 140 operates the transport control protocol.

Chassis supervisor module 420 provides an interface to hardware of the network node 110 and controls monitoring and boot-up or restart of the various application modules, controls software reloads and software upgrades (such as in-service software upgrades ISSUs), providing a command line interface (CLI) for the element manager module 406 and controls access to status or image files of system of the network node 110. During virtual chassis mode, the chassis supervisor module 420 controls boot sequence, controls software reloads and ISSUs and provides an interface for accessing virtual chassis parameters.

Configuration manager module 422 is operable to convert operation of the network node 110 from a virtual chassis mode to a standalone mode or convert a network node 110 from a standalone mode to a virtual chassis mode. Configuration manager module is also operable to configure the virtual chassis manager module 400 and multi-chassis manager module 424. The operation of the configuration manager module 422 and operation states of a network node 110 are described in more detail below.

The network nodes 110 in a virtual chassis system 100 may operate in a plurality of operation modes, including virtual chassis mode, standalone mode and multi-chassis (MC-LAG) mode. Various parameters and configurations are modified depending on the operation mode. Table 5 illustrates the assignment of chassis IDs to network nodes 110 depending on the mode of operation.

TABLE 5

| Operation Mode | Minimum Chassis ID | Maximum Chassis ID |
| --- | --- | --- |
| Standalone | 0 | 0 |
| Multi-Chassis (MCLAG) | 1 | 2 |
| Virtual-Chassis | 1 | N |

In standalone mode, a network node 110 is operated as a single node and utilizes its configured local MAC address rather than a global Virtual Chassis MAC address. In multi-chassis mode, two network nodes are configured as virtual nodes whose MAC forwarding tables and ARP tables are synchronized, but they still operate as separate bridges and routers, each of them using their own local chassis MAC address, as described in more detail in U.S. patent application Ser. No. 13/010,168, entitled, "SYSTEM AND METHOD FOR MULTI-CHASSIS LINK AGGREGATION," filed Jan. 20, 2011. In virtual chassis mode as described herein, a plurality N of network nodes are configured as virtual chassis nodes in a virtual chassis system 100. A globally unique chassis ID from 1 to N is assigned to each of the plurality of network nodes in the virtual chassis system 100.

When a network node 110 operates in standalone mode, port identifiers and configurations follow a format: 0/<slot>/<port>, where the chassis ID equals "zero", slot identifies each Network Interface Module (NIM) 152 in a multi-slot architecture or stackable network element 140 and port is the port interface identifier. When a network node 110 operates in multi-chassis mode, port configurations follow a format: <chassis>/<slot>/<port>, where the chassis ID equals 1 or 2 and represents the operation/current/running chassis ID. When a network node 110 operates in virtual chassis mode, port configurations follow a format: <chassis>/<slot>/<port>, where the chassis ID is a number in the range 1, 2 . . . N and represents the operation/current/running chassis ID.

Figure 9:
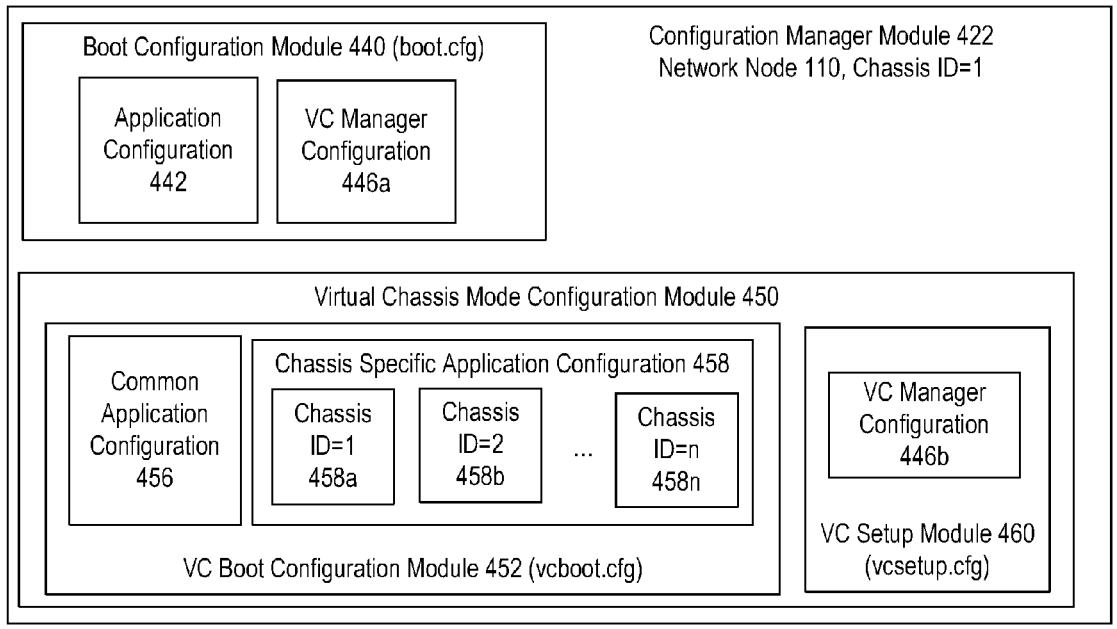
FIG. 9 illustrates a schematic block diagram of an embodiment of a configuration manager module in accordance with the present invention.

FIG. 9 illustrates a schematic block diagram of configuration manager module 422 in more detail. Configuration manager module 422 includes various configuration modules to support the different modes of operation of a network node 110. Boot configuration module 440 in an embodiment supports standalone and multi-chassis modes of operation. Virtual Chassis (VC) Mode configuration module 450 supports virtual chassis mode. The configuration manager module 422 reads and validates the relevant configuration files (boot configuration module 440 or VC mode configuration module 450) at start up and runtime depending on the mode of operation of the network node.

The boot configuration module 440 includes a set of management commands that define resources and specify the network node's parameters and functions in standalone or multi-chassis mode. The boot configuration module 440 includes the application configuration module 442 and the VC Manager configuration module 446a. The application configuration module 442 is used to control configuration of various applications in the network node 110. For example, the application configuration module 442 configures chassis supervisor module 420, VLAN manager application module 410, STP application module 412, multi-chassis manager 424, etc. The VC Manager configuration module 446a includes configuration parameters and control commands processed by the virtual chassis manager 400. The VC manager configuration module 446a is updated and utilized in the boot configuration module 440 when operating in standalone mode. Commands that are specific to the local network node and required to transition the network node to a virtual chassis mode are included in the VC manager configuration module 446a.

However, when operating in virtual chassis mode, the VC manager configuration module 446b in VC mode configuration module 450 is updated and utilized. By including the VC manager configuration modules 446a and 446b in the boot configuration module 440 and VC mode configuration module 450, the network node 110 is operable to perform virtual-chassis related configurations and functions while operating in multi-chassis mode or standalone mode or virtual chassis mode.

VC mode configuration module 450 includes a set of management commands that define resources and specify the network node's parameters and functions in virtual chassis mode. The VC Boot configuration module 452 includes the virtual chassis configurations 458a-n of the plurality of network nodes in the virtual chassis system 100 while the VC setup module 460 includes the local chassis configurations.

Figure 10:
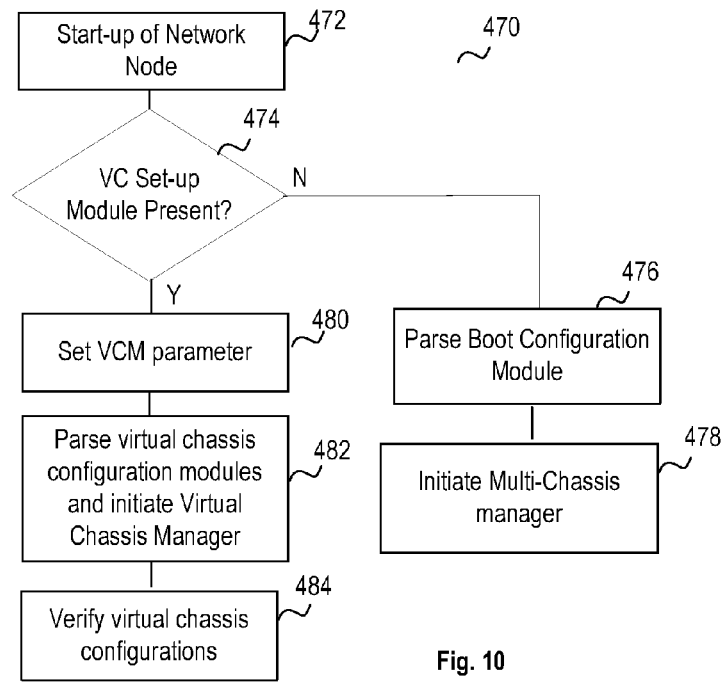
FIG. 10 illustrates a logical flow diagram of an embodiment of a method for determining an operation mode of a network node in a virtual chassis system in accordance with the present invention.

FIG. 10 illustrates a logical flow diagram of an embodiment of a method 470 for determining an operation mode of a network node 110 in a virtual chassis system 100. Chassis supervisor module 420 needs to determine the operation mode (e.g., virtual chassis, standalone or multi-chassis) of the network node 110 at start up prior to configuration because the operation mode determines whether the chassis supervisor module 420 will initiate the multi-chassis manager 424 or the virtual chassis manager 400. In step 472, the network node starts up and in step 474, chassis supervisor module 420 determines whether the VC setup module 460 (vcsetup.cfg) is present in the network node 110. When the VC setup module 460 (vcsetup.cfg) is not present, the network node is not operating in virtual chassis mode, and configuration manager module 422 parses the Boot Configuration Module 440 (boot.cfg file) in step 476 for operation in standalone or multi-chassis mode. The multi-chassis manager 424 is then initiated for processing of the Boot Configuration Module 440 (boot.cfg file) in step 4781.

When the VC setup module 460 (vcsetup.cfg) is present in step 474, the network node operates in virtual chassis mode, and chassis supervisor module 420 initiates virtual chassis manager 400. The chassis supervisor module 420 sets a parameter called "virtual chassis mode" in a shared memory file used by other applications during the start-up process in step 480 to indicate virtual chassis mode operation. The configuration manager module 422 then parses the virtual chassis configuration modules, VC setup module 460 (vcsetup.cfg) and VC boot configuration module (vcboot.cfg), and initiates the virtual chassis manager 400 in step 482. In step 484, the virtual chassis manager 400 confirms that the VC setup module 460 (vcsetup.cfg) includes valid virtual-chassis configurations (e.g, a valid chassis ID). Otherwise, the virtual chassis manager 400 informs the chassis supervisor module 420 that the virtual chassis mode has failed. The chassis supervisor module 422 then disables the port interfaces and VFL member ports. As such, a network node 110 that has a VC setup module 460 (vcsetup.cfg) file but its contents are invalid (e.g. out of range chassis ID, corrupted file, manually edited), will not become operational. No attempt is made to operate the network node 110 in standalone mode because, in some scenarios, this may create network problems due to conflicts between the standalone configuration and the virtual chassis configuration of another network node 110 in the virtual chassis system 100.

Figure 11:
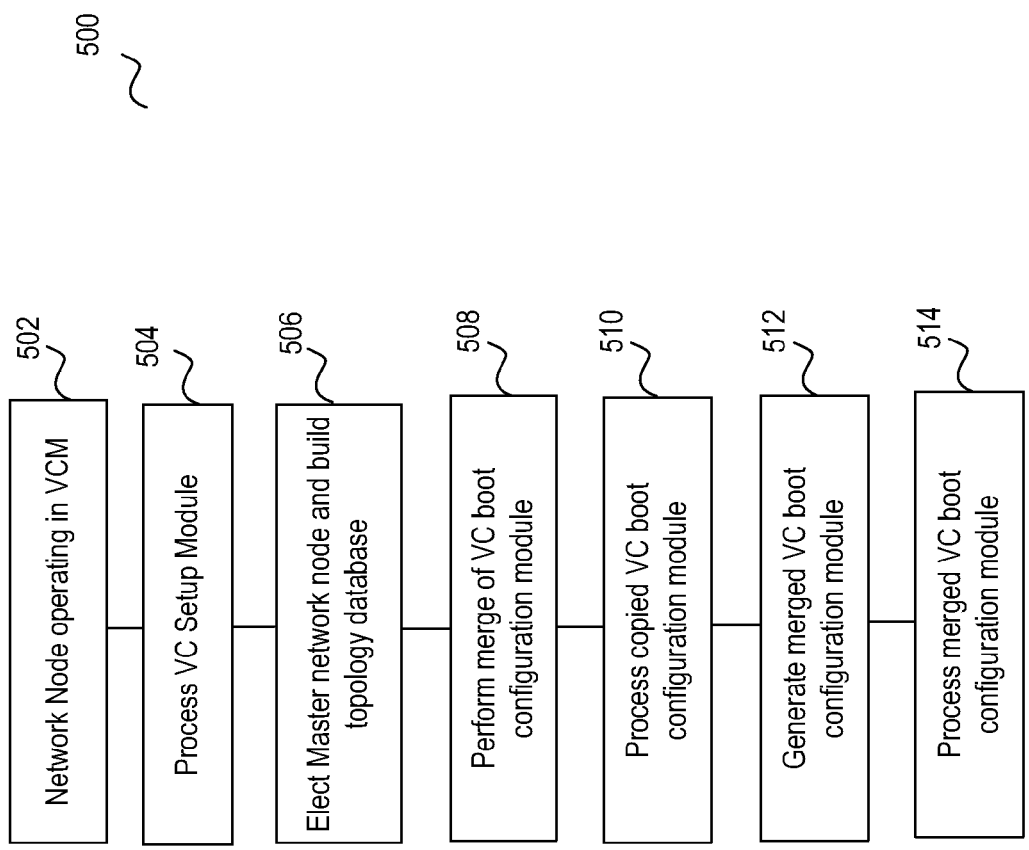
FIG. 11 illustrates a logic flow diagram of an embodiment of a method for configuring a network node at start-up in virtual chassis mode in accordance with the present invention.

FIG. 11 illustrates a logic flow diagram of an embodiment of a method 500 for configuring a network node 110 at start-up in virtual chassis mode. At system start up, when the network node 110 is determined to be operating in virtual-chassis mode in step 502 with valid configurations, the virtual chassis manager 400 processes configuration commands in the VC Setup Module 460 to transition the network node 110 into the virtual chassis system 100. In this initial phase, the virtual chassis manager 400 however does not process the VC boot configuration module 452 commands until a master network node 110 is known and topology database 144 is built by the network node 100. Table 6 below illustrates configuration of the network node 110 in this initial phase. Note that although Table 6 depicts only two network nodes, any number of network nodes is supported. The Runtime Configuration parameter in Table 6 illustrates the modules or set of commands processed by the network nodes 110 during this initial phase.

TABLE 6

| Chassis ID = 1 | Chassis ID = 2 |
|---|---|
| vcsetup1.cfg | vcsetup2.cfg |
| vcboot1.cfg | vcboot2.cfg |
| Runtime Configuration | Runtime Configuration |
| vcsetup1.cfg | vcsetup2.cfg |

After a master network node is elected and topology database is built in step 506, the second phase of configuration processing occurs. During the second phase, the master network node 110 in the virtual chassis system 100 performs a merge of the VC boot configuration module 452 in the master network node (e.g., vcboot1.cfg) and the slave network nodes (e.g., vcboot2.cfg) in step 508. When a network node fails to have the same set of designated configurations in its VC boot configuration module 452, then the slave network node retrieves the configurations from the master network node and overwrites its own files. The slave network node may then need to reboot so that the new set of parameters takes effect. When the designated configurations of the VC boot configuration module 452 are copied, the copied VC boot configuration module 452 (e.g., vcboot1.cfg) is then processed by the slave network nodes in step 510. Table 7 illustrates the configuration of the network nodes during the second phase.

TABLE 7

| Chassis ID = 1 (Master) | Chassis ID = 2 (Slave) |
|---|---|
| vcsetup1.cfg | vcsetup2.cfg |
| vcboot1.cfg | vcboot1.cfg |
| Runtime Configuration | Runtime Configuration |
| vcsetup1.cfg + vcboot1.cfg | vcsetup2.cfg + vcboot1.cfg |

The VC boot configuration module 452 of the master network node (vcboot1.cfg) has now been copied to the slave network node 2. To preserve the configurations from the slave network node, the master network node parses the configuration commands in the slave network node's VC boot configuration module (vcboot2.cfg). The parsing may be performed offline or by an element manager or network manager. The conflicting commands in the slave's VC boot configuration module (vcboot2.cfg) are determined and are saved for analysis. The master network node eliminates the conflicting commands and writes the non-conflicting commands into a merged VC boot configuration module 452 (vcboot2'.cfg) for the slave network nodes in step 512.

In a final stage, the merged VC boot configuration module 452 (vcboot2'.cfg) is copied to the slave network nodes in the virtual chassis system. The VC boot configuration module 452 is then executed by the network nodes 110 in step 514. Table 8 illustrates the configuration of the network nodes 110 after this final phase.

TABLE 8

| Chassis ID = 1 (Master) | Chassis ID = 2 |
|---|---|
| vcsetup1.cfg | vcsetup2.cfg |
| vcboot1.cfg | vcboot2.cfg |
| Runtime Configuration | Runtime Configuration |
| vcsetup1.cfg + vcboot1.cfg + vcboot2'.cfg | vcsetup2.cfg + vcboot1.cfg + vcboot2'.cfg |

As a result, the configuration of the slave network nodes 110 are utilized except for conflicting commands without a need to reboot each slave network node 110. In addition, the configuration of the slave network nodes 110 is preserved.

During set up of a network node 110 in a virtual chassis system, the network node 110 performs neighbor discovery, e.g., to build the topology database 144, elect a master network node, etc. However, at set up, the chassis identifiers and VFL links 120 between network nodes 110 are unknown. In order to communicate, a virtual chassis control protocol is utilized by the network nodes 110 to discover other network nodes and exchange information to build the topology database 144. The virtual chassis control protocol operates on a point-to-point or hop-by-hop basis such that a network node 110 is operable to transmit and receive protocol messages prior to topology discovery. In an embodiment, the virtual chassis control protocol includes protocols and functions of the Intermediate System to Intermediate System (IS-IS) routing protocol, e.g. defined in IEEE Network Working Group RFC 1142, "OSI IS-IS Intra-domain Routing Protocol," February 1990 and IEEE Network Working Group RFC 1195, "Use of OSI IS-IS for Routing in TCP/IP and Dual Environments," December 1990, which are incorporated herein by reference, though other routing protocols or processes may be utilized as a basis to perform the functions and features of the virtual chassis control protocol described herein (e.g., Open Shortest Path First for IP networks, e.g., defined in IEEE Network Working Group RFC 2740, "OSPF for IPv6," December 1999).

In an embodiment, the virtual chassis control protocol messages are exchanged between network nodes using an assigned multicast MAC destination address. When a switching module 210 of a network node 110 receives a virtual chassis control protocol message with the assigned multicast MAC destination address, the switching module 210 forwards the control protocol message to its processing module 266 for processing of the protocol message by the VCM 400 operating in the VCM-NIM 404 or VCM-CMM 402. In another embodiment, the virtual-chassis control protocol messages include a predetermined operation code as part of the prepended header 300. When a switching module 210 receives a virtual chassis control protocol message with the predetermined operation code in the prepended header 300, the switching modules 210 then forwards the control protocol message to its processing module 266 for processing.

Prior to topology discovery, the virtual chassis control protocol uses a point-to-point or hop-by-hop process to exchange protocol messages between adjacent network nodes. To transmit protocol messages to network nodes 110 that are not adjacent neighbors, the virtual chassis control protocol includes an internal propagation process based on a hop count field. The hop count field is decremented in protocol messages at each network node 110 and helps prevent packet loops in the virtual chassis system 100. In an embodiment, the virtual chassis control protocol is included in the virtual chassis manager 400 operating as part of the VCM-CMM or as part of the VCM-NIM 404 though the virtual chassis control protocol may also be operable in one or more alternative or additional modules in a network node 110.

Figure 12:
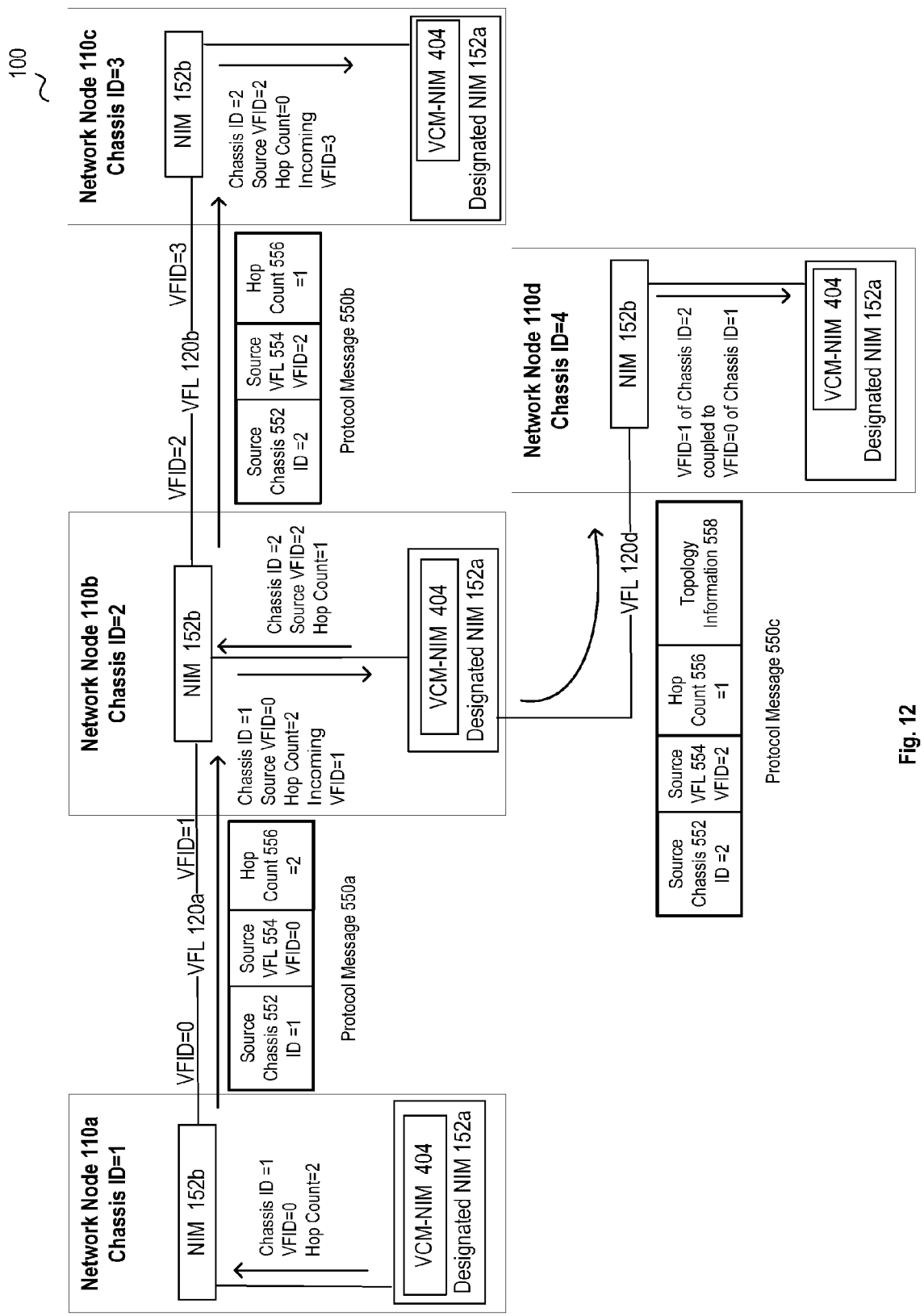
FIG. 12 illustrates a schematic block diagram of an embodiment of topology discovery in a virtual chassis system in accordance with the present invention.

FIG. 12 illustrates a schematic block diagram of an embodiment of topology discovery using the virtual chassis protocol in a virtual chassis system 100. Upon boot up or set up, when a first VFL, such as VFL 120a becomes operational, network node 110a begins topology discovery of the virtual chassis system 100. The virtual chassis manager module 400 (or other module operating the virtual chassis protocol) initiates a protocol message 550a to the switching module 210 of the NIM 152 coupled to the VFL 120a. The protocol message 550a includes a source chassis field 552 that includes the chassis ID of the source network node originating the protocol message and a source VFL field 554 that includes the VFID of the outgoing VFL 120a for the protocol message 550a. The protocol message 550 also includes a hop count field 556. In this example, the protocol message 550 includes source chassis ID=1, source VFID=0 and hop count=2. The protocol message 550 may include additional or alternative fields with similar or additional topology information.

When adjacent network node 110b receives the protocol message 550a, it appends the VFID of the incoming VFL 120a, e.g. incoming VFID=1, to the protocol message 550a and transmits the protocol message to its virtual chassis manager 400, e.g., the VCM 400, for processing in accordance with the virtual chassis control protocol. From protocol message 550a, VCM 400 is operable to determine that network node 110a with chassis ID=1 is an adjacent node. The VCM 400 also determines that network node 110a is coupled to it by VFL 120a having a VFL identifier of VFID=1 for network node 110b and VFID=0 for network node 110a. The VCM 400 is operable to update or populate its topology database 144 with this topology information. The hop count=2 of the protocol message is decremented to hop count=1. Since the hop count is nonzero, the VCM 400 of the network node 110b regenerates the protocol message for transmission to network node 110c to include its source network node information. The regenerated protocol message 550b includes a source chassis ID=2 of source network node 110b, source VFID=2 of source VFL 120b and decremented hop count=1.

When network node 110c receives the protocol message 550b, it appends the VFID of the incoming VFL 120b, e.g. incoming VFID=3, to the protocol message 550b and transmits the protocol message to the VCM 400 for processing in accordance with the virtual chassis control protocol. From protocol message 550b, VCM 400 is operable to determine that network node 110b with chassis ID=2 is an adjacent node. The VCM 400 also determines VFID=2 for network node 110b couples to VFID=3 for network node 110c. The VCM 400 is operable to update or populate its topology database 144 with this topology information. The hop count=1 is decremented to hop count=0. Since the hop count is zero, the VCM 400 operating the virtual chassis control protocol does not regenerate or forward the protocol message.

When a network node 110 determines topology information of an adjacent network node 110, the network node updates its topology database 144 with the topology information and forwards the topology information to other known adjacent nodes coupled via other VFL links. For example, in FIG. 12, when network node 110b determines that network node 110a is an adjacent node through protocol message 550a, network node 110b generates a protocol message 550c to known adjacent network node 110d. The protocol message 550c includes updated topology information in one or more topology fields 558. When network node 110d receives the topology message 550c, it forwards the topology message 550c to the VCM 400 for processing in accordance with the virtual chassis control protocol. The VCM 400 updates its topology database 144 with the topology information in the one or more topology fields 558, e.g. that VFID=1 of Chassis ID=2 is coupled to VFID=0 of Chassis ID=1.

In an embodiment, at set up of a virtual chassis system 100, a predetermined discovery period is configured for network nodes 110 to exchange topology information and generate respective topology databases 144. When the discovery period expires, a master network node is selected from the known network nodes 110. Other network nodes 110 that are discovered or become operational in the virtual chassis system 100 after expiration of the discovery period are not included in the master network node selection process. These newly added network nodes 110 are designated as slave network nodes.

Figure 13:
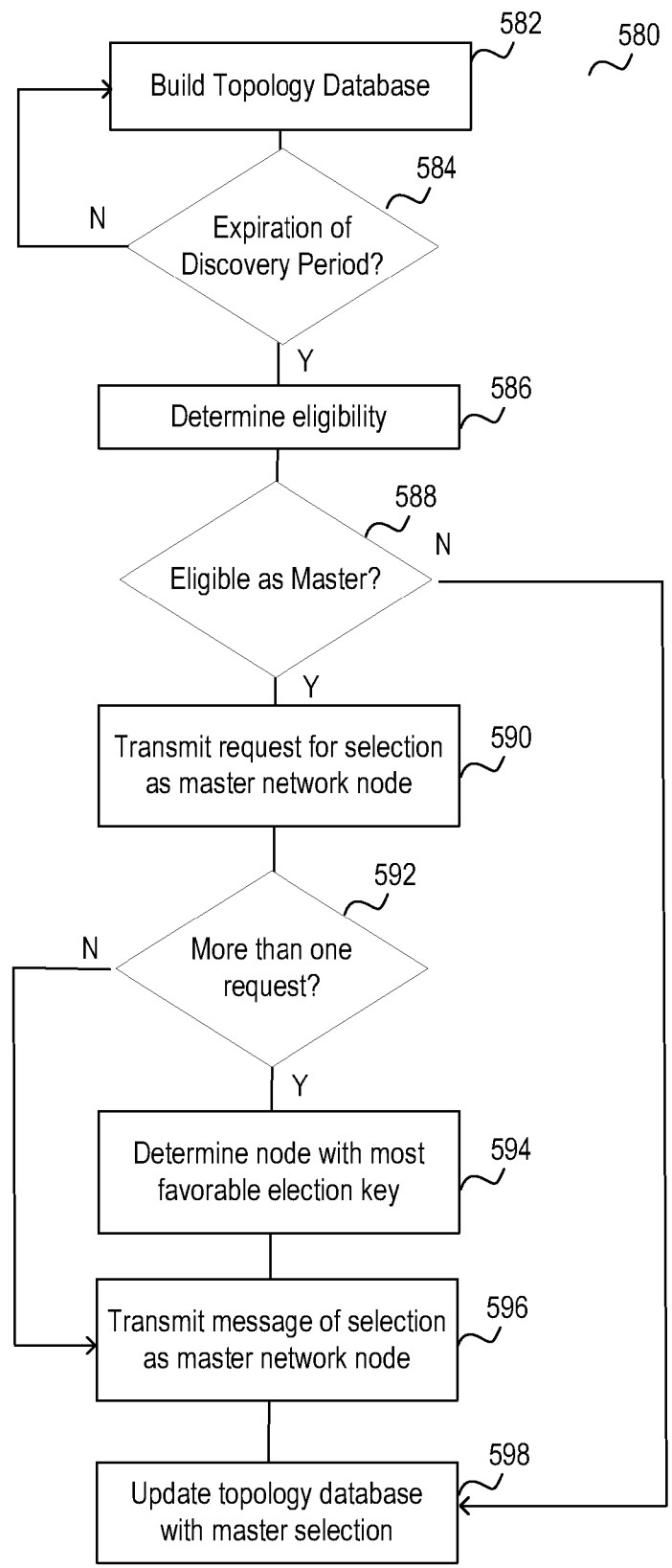
FIG. 13 illustrates a logic flow diagram of an embodiment of a method for selection of a master network node in a virtual chassis system in accordance with the present invention.

FIG. 13 illustrates a logic flow diagram of an embodiment of a method 580 for selection of a master network node using the virtual chassis protocol. In step 582, the network nodes 110 exchange protocol messages to build their respective topology databases during a predetermined discovery period. The selection of a master network node begins upon expiration of the discovery period. In an embodiment, the predetermined discovery period begins upon boot up of a first network node in the virtual chassis system though other start times may be implemented. The discovery period may also vary depending on the topology and node architectures in the virtual chassis system 100. For example, the length of the discovery period is selected to facilitate accurate and predictable master selection without excessively prolonging start up times. By implementing a predetermined time period, the selection of a master network node is not indefinitely delayed due to unknown network nodes or waiting for another network node with a higher priority to connect.

Upon expiration of the discovery period in step 584, the network nodes 110 that have populated and updated their respective topology databases 144 with the topology information for the virtual chassis system 100 begin the selection process for the master network node. The virtual chassis manager module (VCM) 400 or other module operating the virtual chassis control protocol on a network node 110 determines its eligibility to be the master network node in step 586. In an embodiment, a network node 110 determines its eligibility by determining an election key based on one or more parameters. The prioritized list of parameters gives preference, e.g., to greater chassis priority, longer up times, smaller chassis ID and smaller chassis MAC address. The use of the prioritized parameters adds flexibility to the selection process. The chassis priority parameter is a preconfigured priority and defines user preference for the master network node. The chassis priority parameter has the greatest weight in the selection process.

When a network node determines that its election key compares favorably to other nodes' election key and is eligible as a master network node in step 588, the network node 110 transmits a request for selection as the master network node in step 590. In step 592, the network node monitors whether another request is received during a predetermined time period in step 592. When there is no other request after the predetermined time period, the network node 110 transmits a master selection message advertising that it is the master network node in step 596. When the master selection message is received, the other network nodes update their topology database 144 indicating the network node selected as the master and designating the other network nodes as slave nodes in step 598.

In step 592, when more than one network node transmits a request for selection as the master network node during the predetermined time period, the election key of the one or more nodes requesting selection as master are compared. The network node 110 with the most favorable election key in step 594 is selected as the master network node and transmits the master selection message advertising that it is the master network node in step 596. This master selection process helps to prevent the problem of two or more network nodes assuming the role as master network node.

Figure 14A:
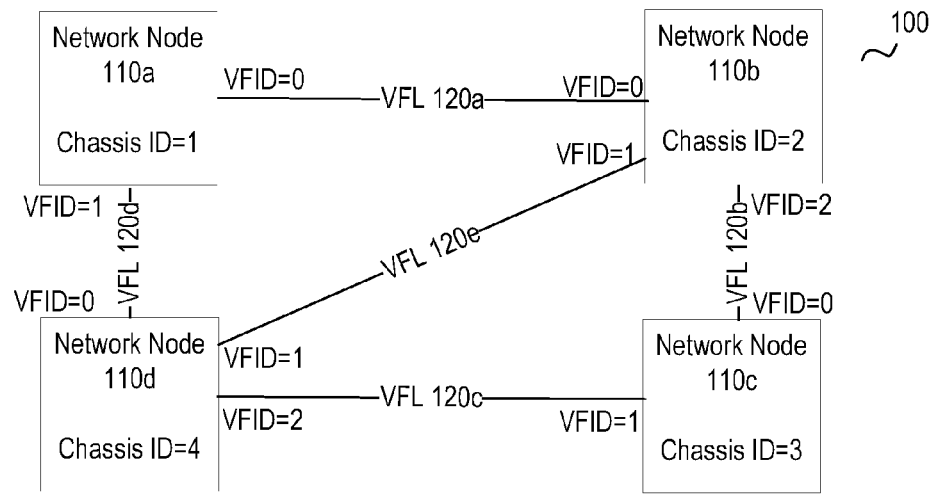
FIGS. 14a-b illustrate a schematic block diagram of an embodiment of routing unicast traffic in a virtual chassis system in accordance with the present invention.
Figure 14B:
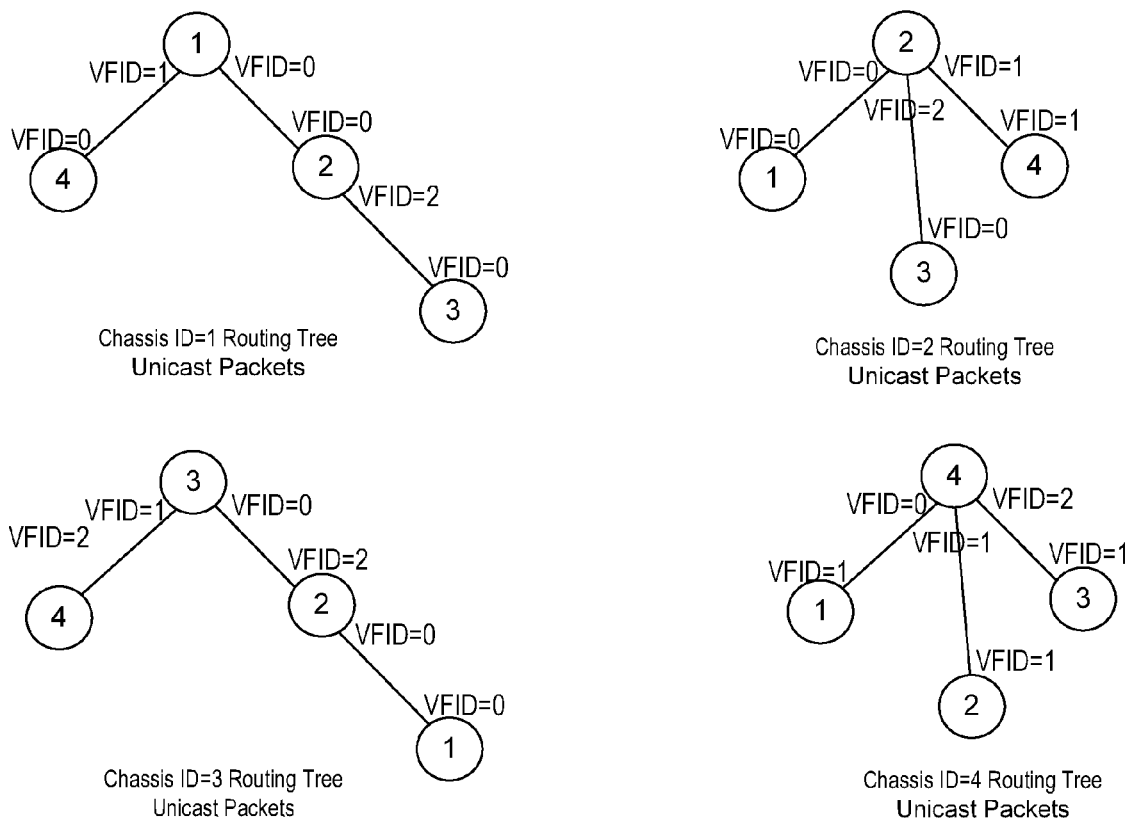

FIGS. 14*a*-*b* illustrate a schematic block diagram of an embodiment of routing unicast traffic in a virtual chassis system 100. FIG. 14*a* illustrates a schematic block diagram of an exemplary virtual chassis topology. In an embodiment, the virtual chassis manager 400 of a network node 110 operating the virtual chassis control protocol analyzes topology information in the topology database 144 and determines a shortest path (e.g. least hop count) for routing unicast packets over VFLs 120 to the other network nodes 110 in the virtual chassis system 100. FIG. 14*b* illustrates a schematic block diagram of routing trees of shortest paths determined for the network nodes 110*a*-*d* in the virtual chassis topology in FIG. 14*a*. Based on the determined shortest paths, the VCM 400 generates VFL routing tables 254 and stores the VFL routing tables 254 in the switching modules 210 of the network nodes 110.

In an embodiment, multiple shortest (e.g., least costly or least hop count) paths between network nodes are supported, and traffic is distributed between the multiple shortest paths as illustrated by an example of VFL routing configuration tables 254 in Table 3 herein. In another embodiment as shown in FIG. 14*b*, in the event of multiple shortest paths, the VCM 400 selects one of the multiple shortest paths for configuring the VFL routing tables 254. The selection may be based on one or more metrics, such as chassis IDs, VFL link characteristics, traffic patterns, etc. For example, the VCM 400 may select one of the plurality of shortest paths based on the sum of chassis IDs in the shortest paths. In another embodiment, selection of one of the shortest paths is based on VFL link characteristics, such as data rate or link speed of VFLs 120. Traffic patterns or other alternative methods or processes may also be implemented to select one of the shortest paths between network nodes 110 in the virtual chassis system 100. The routing trees in FIG. 14*b* are schematic illustrations of the shortest paths configured into the VFL routing tables 254. An example of the VFL routing tables 254 corresponding to the shortest paths shown in FIG. 14*b* is illustrated below in Table 9.

TABLE 9

| VFL Routing Unicast Packets | |
|---|---|
| Destination Chassis ID or Module IDs | Shortest Path |
| Chassis ID = 1 | |
| 1 (Module ID 0-31) | N/A (local) |
| 2 (Module ID 32-63) | VFID = 0 to Chassis 2 |
| 3 (Module ID 64-95) | VFID = 0 to Chassis 2, then VFID = 2 of Chassis 2 to Chassis 3 |
| 4 (Module ID 96-127) | VFID = 1 to Chassis 4 |
| Chassis ID = 2 | |
| 1 (Module ID 0-31) | VFID = 0 to Chassis 1 |
| 2 (Module ID 32-63) | N/A (local) |
| 3 (Module ID 64-95) | VFID = 2 to Chassis 3 |
| 4 (Module ID 96-127) | VFID = 1 to Chassis 4 |
| Chassis ID = 3 | |
| 1 (Module ID 0-31) | VFID = 0 to Chassis 2, then VFID = 0 to Chassis 1 |
| 2 (Module ID 32-63) | VFID = 0 to Chassis 2 |
| 3 (Module ID 64-95) | N/A (local) |
| 4 (Module ID 96-127) | VFID = 1 to Chassis 1 |
| Chassis ID = 4 | |
| 1 (Module ID 0-31) | VFID = 0 to Chassis 1 |
| 2 (Module ID 32-63) | VFID = 1 to Chassis 2 |
| 3 (Module ID 64-95) | VFID = 2 to Chassis 3 |
| 4 (Module ID 96-127) | N/A (local) |

The VFL routing tables 254 illustrated in Table 9 include only one shortest path for a destination chassis ID though one or multiple equally costly paths may exist. In another embodiment, a plurality of shortest paths may be included along with one or more metrics for determining the one of the plurality of paths to select for a particular unicast packet flow. The VFL routing tables 254 in an embodiment include destination module IDs in addition to or alternatively to the chassis IDs. In an embodiment, globally unique module identifiers (MIDs) are assigned to the switching modules 210 in the plurality of network nodes 110 in a virtual chassis system 100. The globally unique MIDs of the destination switching modules 210 are included in the VFL routing tables 254 (and prepended headers of packets) in addition to or alternatively to the destination chassis IDs.

Figure 15A:
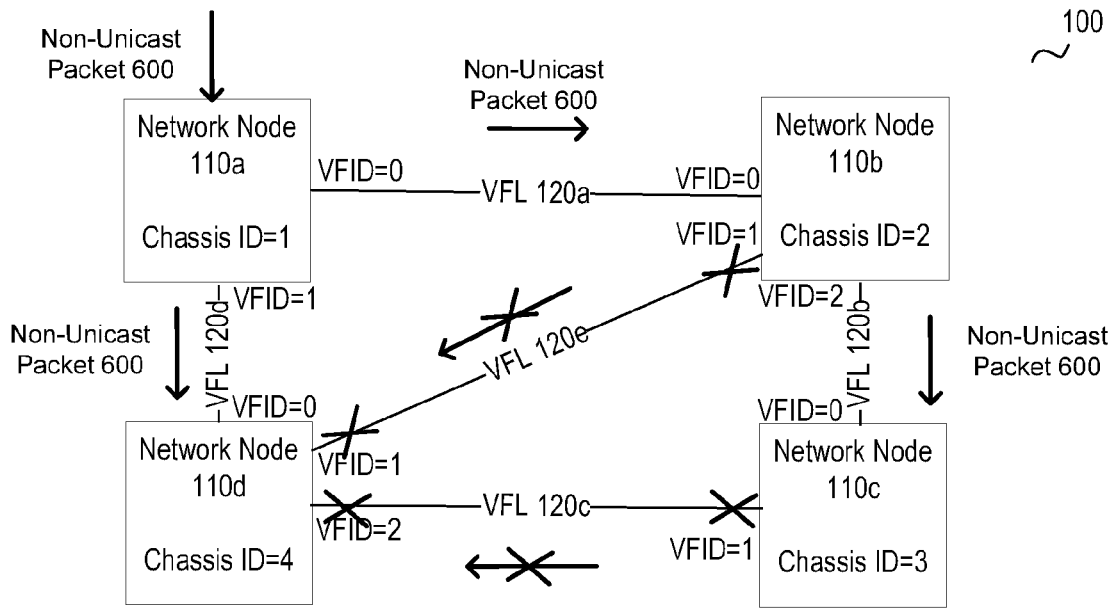
FIGS. 15a-b illustrate a schematic block diagram of an embodiment of routing non-unicast traffic in a virtual chassis system in accordance with the present invention.
Figure 15B:
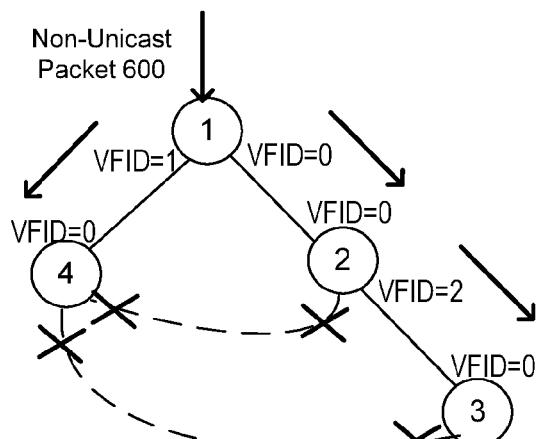

FIGS. 15a-b illustrates a schematic block diagram of an embodiment of routing non-unicast traffic in a virtual chassis system 100. The virtual chassis manager module (VCM) 400 of a network node 110 operating the virtual chassis control protocol analyzes topology information in the topology database 144 and determines paths for routing non-unicast packets, such as multicast or broadcast packets, to the other network nodes 110 over VFLs 120 in the virtual chassis system 100. The VCM 400 routes the non-unicast packets in an attempt to prevent loops and duplicate packets from being received by a network node 110. In an embodiment, the VCM 400 determines the path for a non-unicast packet based on the configured unicast shortest paths for the source network node of the non-unicast packet.

FIG. 15a illustrates a schematic block diagram of a virtual chassis system 100 with an ingress multicast packet 600 received by network node 110a on an external port interface 240. Network node 110a forwards the multicast packet 600 to network node 110b over VFL and generates a duplicate copy for forwarding to network node 110d over VFL 120d. Network node 110b receives the non-unicast packet 600 and forwards it to network node 110c. Without further routing configuration, network node 110b would also generate a duplicate copy of the non-unicast packet 600 for forwarding to network node 110d over VFL 120e. Similarly, network node 110c would also forward a copy of the non-unicast packet 600 over VFL 120c to network node 110d. As such, network node 110d would receive three copies of the non-unicast packet. To prevent such multiple copies of a packet from being received at a network node, the VCM 400 blocks certain paths based on the source or ingress network node of the non-unicast packet 600 and the shortest paths configured for unicast packets for the source network node.

FIG. 15b illustrates a schematic block diagram of an embodiment of a routing tree for routing a non-unicast packet 600 through the virtual chassis system 100 to prevent loops and duplicate packets at a network node. The routing tree illustrates a configuration of the network nodes 110a-d for routing non-unicast packets that ingress the virtual chassis system 100 at source or ingress network node 110a. The VCM 400 determines the routing of non-unicast packets based on the source network node and based on the routing tree or shortest paths configured for unicast packets for the source network node 110. For example, network node 110b receives the non-unicast packet 600 on VFL 120a. Network node 110b determines that the source hardware device information (chassis ID or module ID) of the prepended header of the non-unicast packet 600 is associated with network node 110a. Network node 110b determines from the VFL routing tables 254 (such as shown in Table 9 and FIG. 15b) the shortest paths configured from it for unicast packets for the source network node 110a. The VFL routing tables 254 indicate that the shortest paths for network node 110a include VFID=2 from Chassis ID=2 to Chassis ID=3. As such, network node 110b (Chassis ID=2) forwards the non-unicast packet to network node 110c (Chassis ID=3) over VFL 120b with VFID=2. Network node 110b does not forward the non-unicast packet 600 over VFL 120e to network node 110d as this path is not included in the shortest paths configured for network node 110a. As such, non-unicast packets are routed in response to the source or ingress network node and the shortest paths for unicast packets configured for the source network node.

In an embodiment, to implement this routing, egress-filtering is implemented to block non-unicast packets from VFLs 120 excluded from the configured shortest paths of the source network node. In another embodiment, to implement the routing, ingress-filtering is implemented by receiving network nodes to block incoming non-unicast packets from VFLs 120 excluded from the configured shortest paths of the source network node. For example, network node 110d with Chassis ID=4 blocks non-unicast traffic with a source network node of network node 110a from VFID=1 and VFID=2. Thus for ingress filtering, a network node blocks non-unicast packets with a source network node on VFL links not included in the shortest path from the source network node for unicast packets. In an embodiment, egress filtering is implemented in multi-slot chassis-based type architectures while ingress filtering is implemented on single slot or standalone network elements though other implementations of filtering are possible on different types of nodes and network interface modules.

Figure 16:
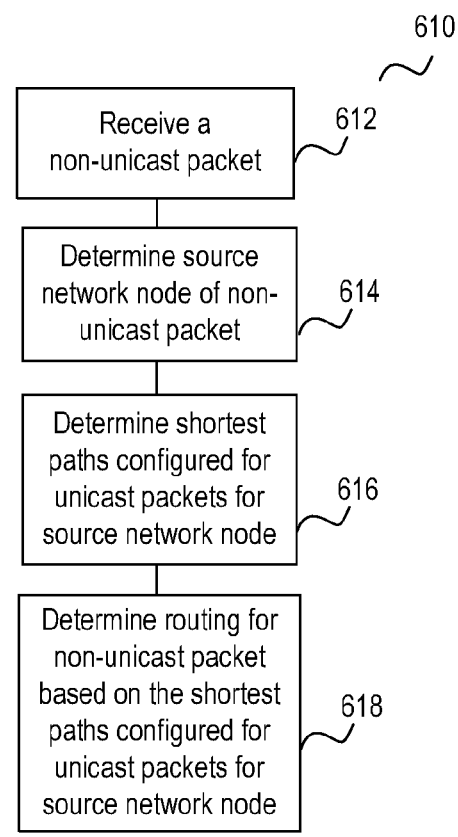
FIG. 16 illustrates a logic flow diagram of an embodiment of a method for routing non-unicast traffic in a virtual chassis system in accordance with the present invention.

FIG. 16 illustrates a logic flow diagram of an embodiment of a method 610 for routing non-unicast traffic in a virtual chassis system 100. In step 612, a network node 110 in a virtual chassis system 100 receives a non-unicast packet on a VFL 120. The receiving network node 110 determines the source network node (e.g., from the source chassis ID or source MID) of the non-unicast packet from the prepended header in step 614. The receiving network node accesses its address tables to determine the shortest paths configured for unicast packets for the source network node 110 in step 616. In step 618, the receiving network node determines routing for the non-unicast packet based on the shortest paths configured for unicast packets for the source network node. The receiving network node then forwards the non-unicast packet over one or more VFLs in the shortest paths for unicast packets from the receiving network node configured for the source network node.

During operation, a network node 110 in a virtual chassis system 100 is operable to detect and recover from one or more types of failures including network node failure, network interface failure, application module failure, and VFL failures. In an embodiment, pass thru mode provides a system and method for user data and control traffic to flow through a network node in a virtual chassis system in response to detection of misconfiguration, inconsistencies or failures in a network node 110. Pass thru mode helps to avoid topology fracture and service interruption in a virtual chassis system and is described in more detail with respect to U.S. application Ser. No. 13/674,352, entitled, "SYSTEM AND METHOD FOR A PASS THRU MODE IN A VIRTUAL CHASSIS SYSTEM," filed on the same day herewith and incorporated by reference herein.

A network node 110 is also operable to detect and recover from various network issues, such as a merge of two or more virtual chassis systems 100. A virtual chassis system 100 is configured with a virtual chassis group identifier. In some instances, it is advantageous to merge two or more virtual chassis systems 100 with different group identifiers. When two virtual chassis systems 100 are merged, a master network node is selected from the two virtual chassis systems as the master network node for the merged virtual chassis system. The network nodes in the other virtual chassis systems reconfigure and resynchronize to the configurations and parameters of the selected master network node similarly as described with respect to FIG. 11 for merging VC boot configuration modules. Such reconfiguration may require restarting of the network nodes 110.

Figure 17:
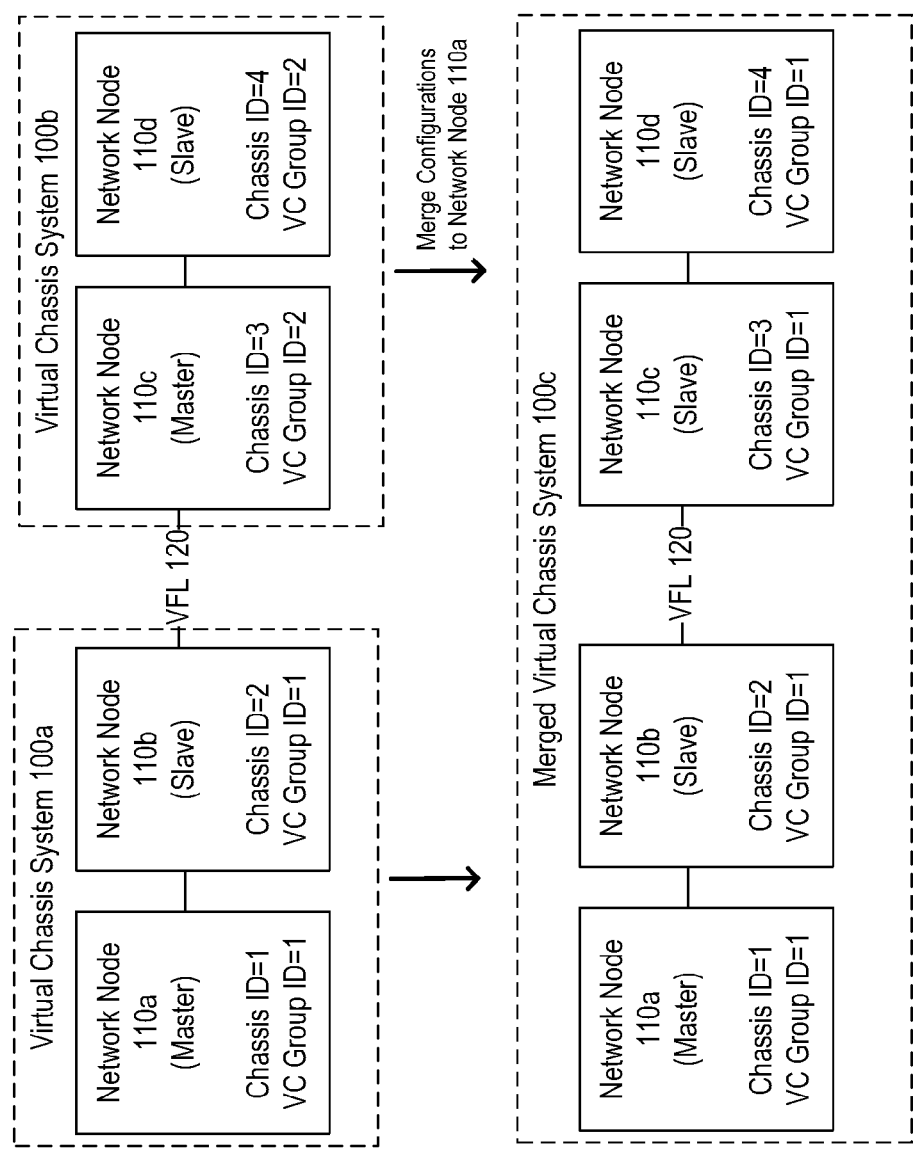
FIG. 17 illustrates a schematic block diagram of an of a virtual chassis system merge in accordance with the present invention.

FIG. 17 illustrates a schematic block diagram of an embodiment of a virtual chassis system merge. A first virtual chassis system 100a with a first virtual chassis group ID=1 merges with a second virtual chassis system 100a with a second virtual chassis group ID=2. To select between the master network nodes of the two virtual chassis systems 100a and 100b, in an embodiment the election keys, e.g. a prioritized list of parameters, of the master network nodes are compared though other methods may be implemented as well. The master network node with an election key that compares favorably is selected as the merged master network node. In the example of FIG. 17, network node 110a is selected as the merged master network node. The non-selected master network node 110c transitions to slave mode and synchronizes its configurations to the selected master network node 110a. In addition, the other network nodes, such as network node 110d, in the virtual chassis system with the non-selected network node also synchronize their configurations to the selected master network node 110a.

Figure 18:
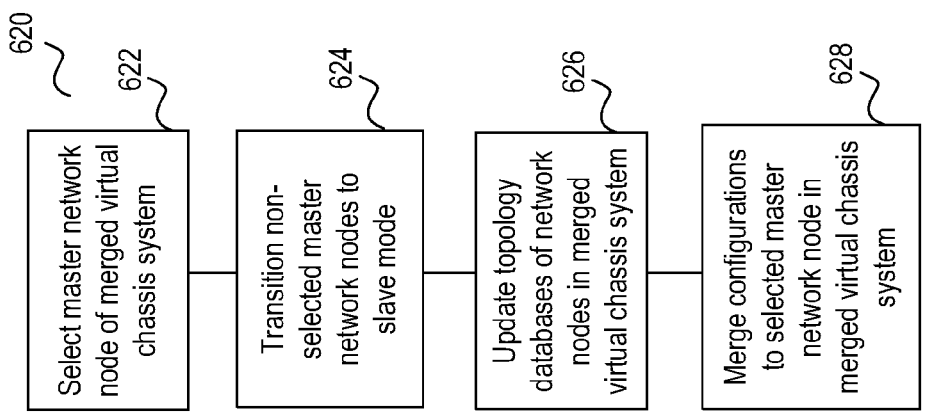
FIG. 18 illustrates a logic flow diagram of an embodiment of a method for a virtual chassis system merge in accordance with the present invention.

FIG. 18 illustrates a logic flow diagram of an embodiment of a method 620 for a virtual chassis system merge. In step 622, a master network node is selected for the merged virtual chassis system. In an embodiment, the master network node is selected from the existing master network nodes in the two or more merging virtual chassis systems. Election keys, e.g. a prioritized list of parameters, are compared to select between the existing master network nodes though other methods may be implemented as well. In another embodiment, a non-master network node is selected (such as a slave node) as the master network node for the merged virtual chassis system. For example, a non-master network node may be selected when the existing master network nodes include duplicative chassis identifiers or a failure occurs in one or more of the existing master network nodes or a non-master network node has a more favorable election key.

When the master network node is selected for the merged virtual chassis system, the existing, non-selected master network nodes transition to slave mode in step 624. The network nodes then update their topology databases 144 with the topology information of the merged virtual chassis system in step 626 and merge configurations to the selected master network node in the merged virtual chassis system in step 628. Network nodes may need to be restarted or rebooted to merge configurations with the selected master network node as further described with respect to FIG. 11. Network nodes that have already synchronized with the selected master network node, e.g. previously a slave node to the selected master network node, may not perform this step. Other additional processes or methods may be implemented for situations involving network nodes 110 with duplicative chassis IDS in a merged virtual chassis system as described in more detail with respect to U.S. application Ser. No. 13/674,352, entitled, "SYSTEM AND METHOD FOR A PASS THRU MODE IN A VIRTUAL CHASSIS SYSTEM," filed on the same day herewith and incorporated by reference herein.

In addition to the virtual chassis control protocol, a network node 110 in a virtual chassis system 100 may operate additional control or transport protocols for performing various functions. For example, additional control protocols may be implemented between application modules within a network node or between modules on different network nodes for facilitating communications and data sharing between the applications for health monitoring or other functions. In an embodiment, an inter-process communication (ICP) protocol is implemented as described in more detail in U.S. Application No. 2012/0033678, entitled, "Multi-Chassis Inter-Process Communication," filed Jan. 20, 2011, which is hereby incorporated herein. The IPC protocol implemented by the aggregate switches in a multi-chassis system described therein may also be similarly utilized by network nodes 110 in a virtual chassis system 100 for facilitating communications and data sharing between the application modules of the network nodes 100.

In an embodiment, IPC is implemented to facilitate health monitoring functions between network nodes 110 in a virtual chassis system 100, though alternative or additional protocols may also be implemented to perform the health monitoring functions described herein. The health monitoring functions include periodic checks within a network node and between network nodes 110 to ensure that the application modules 408-418 within a network node are operational and that the network nodes 110 are able to communicate with the other network nodes 110 in the virtual chassis system 100. The health monitoring also detects any failures in the virtual connections between application modules and helps to prevent premature or false failure detection.

Figure 19:
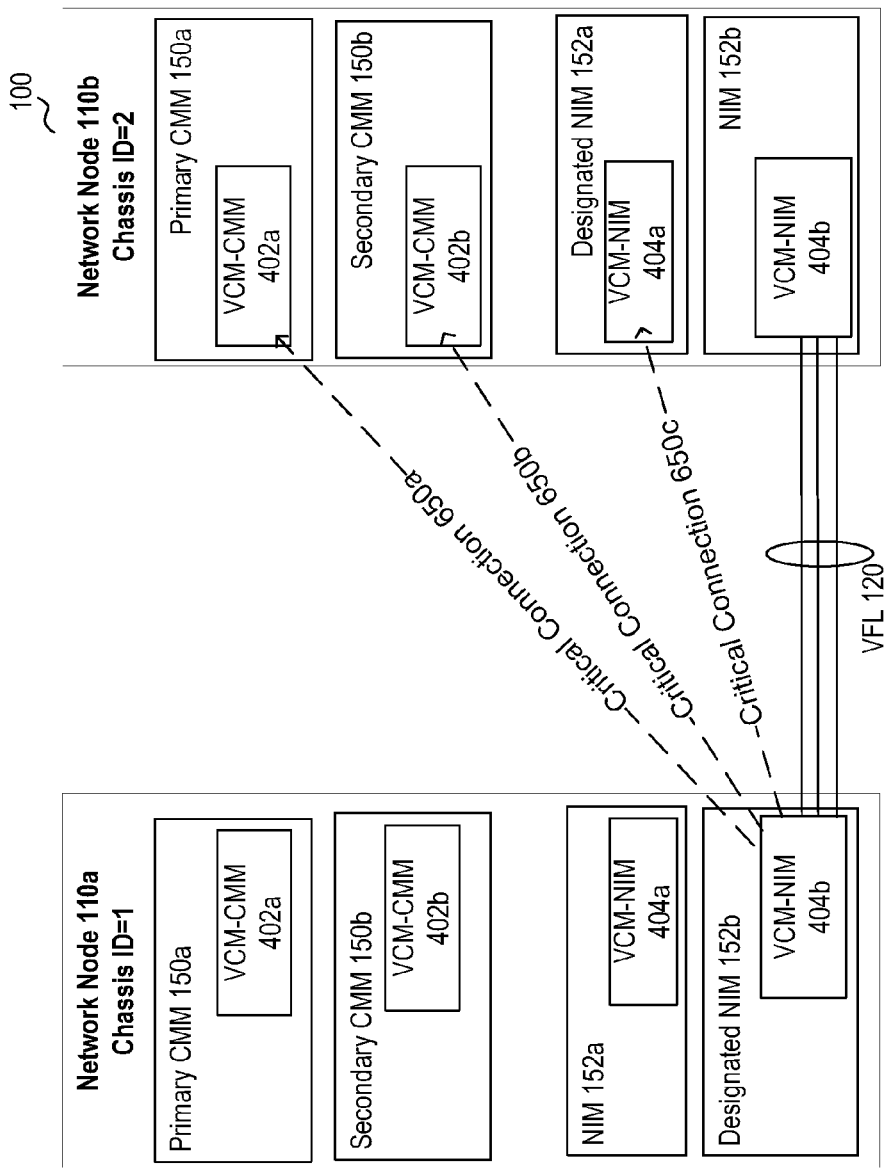
FIG. 19 illustrates a schematic block diagram of an embodiment of health monitoring in a virtual chassis system in accordance with the present invention.

FIG. 19 illustrates a schematic block diagram of an embodiment of health monitoring in a virtual chassis system 100. In an embodiment, health monitoring includes establishment of one or more logical or virtual connections between adjacent network nodes 110 over VFL 120. The virtual connections for health monitoring are referred to herein as critical connections. Depending on the virtual chassis topology and the architecture of the network nodes 110, various control and transport protocols may be used for supporting the critical connections. For example, in an embodiment, IPC (Inter-Process Communication) over an internet protocol socket (such as Transport Control Protocol (TCP) sockets, User Datagram Protocol (UDP) sockets, etc.) is used to implement the critical connections between adjacent network nodes 110. For example, in an embodiment, application modules 408-418 in network nodes 110 utilize IPC connections over TCP sockets for communication and to share data. As such, the use of the same IPC connections over TCP sockets for health monitoring provides an indication that the application modules 408-418 are also able to communicate using these connections. Though IPC over TCP is described herein, other types of virtual connections using one or more other control or transport protocols and mechanisms may be implemented as well to support health monitoring and the sharing of data between the application modules 408-418.

In an embodiment, as shown in FIG. 19, one or more critical connections 650 are established between adjacent network nodes 110 for health monitoring. For example, in an embodiment, three critical connections are established between network node 110a and adjacent network node 110b. One critical connection is established between the designated NIM 152b of network node 110a and the primary CMM 150a of adjacent network node 110b. Another critical connection is established between the designated NIM 152b of the network node 110a and the secondary CMM 150b of the adjacent network node 110b. And another critical connection is established between the designated NIM 152b of the network node 110a and the designated NIM 152a of the adjacent network node 110. The identity of the primary and secondary CMM 150 and designated NIMs 152 are determined through topology discovery using the virtual chassis control protocol. Though not shown, critical connections are also established between the designated NIM 152a of network node 110b and the designated NIM 152b, primary CMM 150a and secondary CMM 150b of network node 110a. One or more other or alternative critical connections may also be established between the network nodes 110.

The state of the adjacent network node 110b is monitored by network node 110a by transmitting periodic health monitoring messages, such as hello or keep-alive messages, over the critical connections 510. When a response to a threshold number of hello or keep-alive messages is not received within a predetermined time period, the critical connection 650 is transitioned to a failed state (e.g., timed out) state. In an embodiment, when a threshold number of the critical connections have failed or timed out, the state of the adjacent network node 110b is transitioned to inactive or inoperational. For example, in an embodiment, when at least one of the critical connections 650a-c is operational, the network node 110b is still considered in an operational state. When all the critical connections have failed, then the network node 110b is transitioned to an inoperational state.

In another embodiment, various rules governing the critical connections 650 are implemented to determine the state of the adjacent network node 110b. For example, when two critical connections 650a and 650b to the primary CMM 150a and secondary CMM 150b of network node 110b fail, then network node 110b is considered inoperational. However, if two critical connections 650b to the secondary CMM 150b and critical connection 650c to the designated NIM 152a fail, network node 110b is still considered operational. In another example, when critical connection 650c to the designated NIM 152a of network node 110b fails, a predetermined time period is set to wait for a new designated NIM to take over. If no new designated NIM 152 has become operational upon expiration of the predetermined time period, then the network node 110b is considered inoperational.

When a network node 110 is transitioned to an inoperational state, the critical connections 650 between the inoperational network node and other network nodes in the virtual chassis system 100 are closed. The other network nodes 110 flush the MAC addresses for the inoperational network node from their MAC/HDI address tables 250 and transition the role of the inoperational network node in the topology database 144 to inoperational or inconsistent or flush the topology information for the inoperational node. When the inoperational network node has the master role, another master network node is selected. Since the virtual chassis control protocol uses a different transport protocol, it may still be functional when the critical connections (using e.g., IPC over TCP) are closed (or fail). In this event, the inoperational network node may transition to a pass thru mode, especially if the inoperational network node causes a virtual chassis split in the topology.

When health monitoring determines that a VFL 120 coupled to a network node 110 has failed, the topology information is analyzed to determine whether the failed VFL 120 causes a virtual chassis split. In the event of a virtual chassis split, the one or more network nodes 110 isolated from the topology by the failed VFL 120 are transitioned to an inoperational state and similar steps are performed as described above for the inoperational network nodes. When the failed VFL 120 does not cause a virtual chassis split, e.g. one or more other VFLs 120 are operably coupled to the network nodes 110, the topology database 144 is updated to remove the failed VFL 120 and the address tables are reconfigured to determine paths through the virtual chassis system over the remaining operational VFLs 120.

When health monitoring determines that a NIM 152 of a network node 110 has failed, the critical connections 650 with the failed NIM 152 are closed. MAC addresses associated with the switching modules 210 and external port interfaces 240 of the failed NIM 152 are flushed from the MAC/HDI address tables of the network nodes 110 in the virtual chassis system 100. When the failed NIM 152 includes VFL member ports to one or more VFLs 120, topology information is analyzed to determine whether the failed VFL member ports cause a virtual chassis split. If so, the one or more network nodes 110 isolated from the topology by the failed VFL member ports are transitioned to an inoperational state and similar steps are performed as described above for the inoperational network nodes.

When health monitoring determines that a CMM 150 of a network node 110 has failed, the critical connections 650 with the failed NIM 152 are closed. When the failed CMM is the primary, the secondary CMM will transition to the primary CMM.

Figure 20:
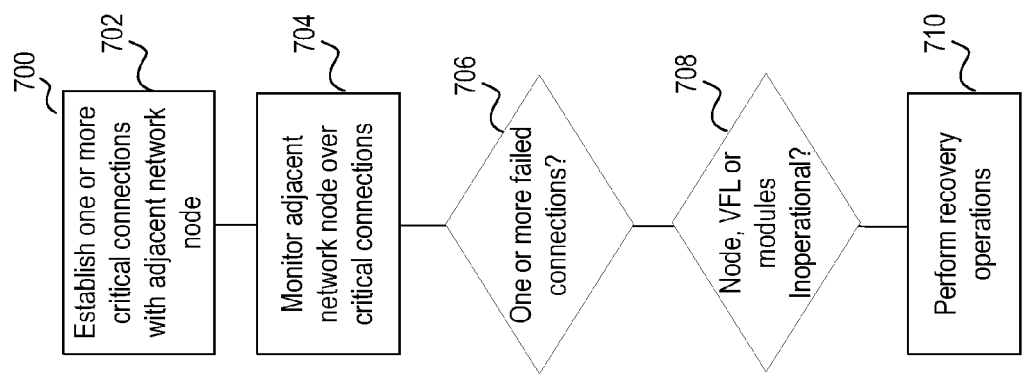
FIG. 20 illustrates a logical flow diagram of an embodiment of a method for health monitoring in a virtual chassis system in accordance with the present invention.

FIG. 20 illustrates a logical flow diagram of an embodiment of a method 700 for health monitoring of a network node 110 in a virtual chassis system 100. In step 702, one or more critical connections are established by a monitoring network node with one or more application modules, control modules or switching modules of an adjacent network node. The one or more critical connections may be established over VFLs 120 coupled to the adjacent network node or over other physical links coupling the adjacent network node. The critical connections in an embodiment are virtual connections based on ICP over TCP sockets though other transport or control protocols may be implemented to establish the critical connections. In step 704, the monitoring network node monitors the adjacent network node over the critical connections using keep alive, hello or other types of monitoring protocols. In an embodiment, a monitoring message is transmitted at predetermined intervals over the critical connections to the adjacent network node. The monitoring network node waits for a predetermined time period for a reply to the monitoring messages. When no reply is received, the monitoring network node transmits another monitoring message and waits for another predetermined time period. When the adjacent network node fails to respond to a predetermined number of monitoring messages over one or more critical connections, the monitoring network node determines that one or more of the critical connections has failed in step 706. In response to the one or more failed critical connections, the monitoring network node 110 determines in step 708 whether the adjacent network node, VFL (or other physical link), application module, control module or switching module of the adjacent network node has failed or become inoperational. If so, the adjacent network node performs recovery operations in step 710 as described herein.

The network nodes 110 in a virtual chassis system 100 are treated as a single logical device with a common virtual chassis MAC address. As such, external nodes 112 are operable to actively forward traffic on all the links of a VC-LAG 114 operatively coupled to two or more network nodes 110. This feature enables multiple homing of the external nodes 112 to the network nodes 110 without requiring spanning tree protocols between the external nodes and network nodes while still facilitating a carrier-grade detection and convergence time to edge uplink failures as well as network node 110 failures. Another advantage of the active forwarding mode of all the VC-LAG 114 uplinks to the virtual chassis system 100 is increased efficiency of the use of bandwidth of the VC-LAG 114 links. The virtual chassis system 100 thus provides a resilient network between network nodes having one or more different types of node architectures in one or more different types of network topologies.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item, or one item configured for use with or by another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional schematic blocks, and other illustrative blocks, modules and components herein, can be implemented as illustrated or combined or separated into discrete components, application specific integrated circuits, processors executing appropriate software and the like or any combination thereof.

The present invention is described herein, at least in part, in terms of one or more embodiments. An embodiment is described herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements.

The term "module" is used in the description of the various embodiments of the present invention. A module includes a processing module (as described above), a functional block, hardware, and/or software stored on memory operable to perform one or more functions as described herein. Note that, if the module is implemented via hardware, the hardware may operate independently and/or in conjunction with software and/or firmware. When a module is implemented as software stored in memory, the module is operable to use a processing module or other hardware to execute the software stored in memory in the module to perform the functions as described herein. A module described herein may include one or more sub-modules, each of which may be one or more modules, be incorporated into one or more other modules or include one or more other modules.

While particular combinations of various functions and features of the present invention are expressly described herein, other combinations of these features and functions are likewise possible. The embodiment described herein are not limited by the particular examples described and may include other combinations and embodiments.

What is claimed is:

1. A network node in a virtual chassis system, comprising:
a plurality of virtual fabric links (VFLs) operably coupled between the network node and a plurality of other network nodes in the virtual chassis system;
at least one network interface module operable to receive a first protocol message including a source chassis identifier of an adjacent network node and a hop count; and
a virtual chassis manager to provide notifications on a status of the virtual chassis system based upon control data exchange, negotiation and agreement with respect to the network node and the plurality of other network nodes, the virtual chassis manager configured to facilitate transition of the adjacent network node to the virtual chassis system by:
determining an incoming VFL identifier of a first VFL receiving the first protocol message;
storing the source chassis identifier of the adjacent network node and incoming VFL identifier in a topology database;
providing a set of designated configurations to the adjacent network node, the set of designated configurations comprising a set of management commands that define network resources.

2. The network node of claim 1, wherein the virtual chassis manager is further operable to:
decrement the hop count in the protocol message; and
generate a second protocol message with a source chassis identifier of the network node and the decremented hop count for transmission over a second VFL to another adjacent network node.

3. The network node of claim 1, wherein the at least one network interface module is further operable to:
receive a data packet with a destination MAC address associated with the adjacent network node;
determine destination hardware device information associated with the adjacent network node from one or more address tables, wherein the one or more address tables are generated based on the topology database; and
generate a packet with a pre-pended packet header for transmission over the first VFL to the adjacent node, wherein the pre-pended header includes the destination hardware device information of the adjacent network node.

4. The network node of claim 1, wherein the virtual chassis manager is included in one or more of:
the at least one network interface module and a control manager module.

5. The network node of claim 1, wherein the virtual chassis manager is further configured to:
determine an election key based on a prioritized list of parameters for the network node;
when the election key compares favorably to one or more of the plurality of other network nodes in the virtual chassis system, transmit a request for selection as a master network node of the virtual chassis system.

6. The network node of claim 1, wherein the virtual chassis manager is further configured to:
determine shortest paths to the plurality of other network nodes in the virtual chassis system for unicast packets based on the topology database.

7. The network node of claim 6, wherein the virtual chassis manager is further configured to:
determine routing for a non-unicast packet based on the shortest paths configured for unicast packets for a source network node of the non-unicast packet.

8. The network node of claim 1, wherein the least one network interface module is further operable to:
monitor the adjacent network node over one or more critical connections established over the first VFL; and
when one or more of the critical connections fail, determine whether the adjacent network node is operational.

9. The network node of claim 8, wherein the least one network interface module monitors the adjacent network node over the one or more critical connections by:
transmitting monitoring messages at predetermined time periods to the adjacent network node over the one or more critical connections.

10. A method operable in a network node, comprising:
receiving a first protocol message including a source chassis identifier of an adjacent network node and a hop count over a first virtual fabric link (VFL) operably coupled between the network node and the adjacent network node in a virtual chassis system;
determining a VFL identifier of the first VFL;
storing the source chassis identifier of the adjacent node and the VFL identifier of the VFL in a topology database; and
providing a set of designated configurations to the adjacent network node, the set of designated configurations comprising a set of management commands that define network resources.

11. The method of claim 10, further comprising:
decrementing the hop count in the protocol message; and
generating a second protocol message with a source chassis identifier of the network node and the decremented hop count for transmission over a second VFL to another adjacent network node.

12. The method of claim 10, further comprising:
receiving a data packet with a destination MAC address associated with the adjacent network node;
determining destination hardware device information associated with the destination MAC address from one or more address tables, wherein the one or more address tables are generated based on the topology database; and
generating a packet with pre-pended packet header, wherein the pre-pended header includes the destination hardware device information of the adjacent network node; and
transmitting the packet with pre-pended header over the first VFL to the adjacent node.

13. The method of claim 10, further comprising:
determining an election key based on a prioritized list of parameters for the network node; and
transmitting a request for selection as a master network node of the virtual chassis system, wherein the request includes the election key.

14. The method of claim 10, further comprising:
determining shortest paths to a plurality of other network nodes in the virtual chassis system for unicast packets based on the topology database.

15. The method of claim 14, further comprising:
determining routing for a non-unicast packet based on the shortest paths configured for unicast packets for a source network node of the non-unicast packet.

16. The method of claim 10, further comprising:
monitoring the adjacent network node over one or more critical connections established over the first VFL; and when one or more of the critical connections fail, determining whether the adjacent network node is operational.

17. A network node in a virtual chassis system, comprising:
a plurality of virtual fabric links (VFLs) operably coupled between the network node and a plurality of other network nodes in the virtual chassis system;
a virtual chassis manager to provide notifications on a status of the virtual chassis system based upon control data exchange, negotiation and agreement with respect to the network node and the plurality of other network nodes, the virtual chassis manager configured to facilitate transition of adjacent network nodes of the plurality of other network nodes to the virtual chassis system by:
  generating a topology database based on one or more protocol messages received from the adjacent network nodes of the plurality of other network nodes in the virtual chassis system, wherein the protocol messages include a source chassis identifier field, a source VFL identifier field and a hop count field; and
  providing a set of designated configurations to the adjacent network nodes of the plurality of other network nodes, the set of designated configurations comprising a set of management commands that define network resources.

18. The network node of claim 17, further comprising at least one network interface module operable to:
receive a data packet with a destination MAC address associated with one of the plurality of other network nodes in the virtual chassis system;
determine destination hardware device information associated with the one of the plurality of other network nodes from one or more address tables, wherein the one or more address tables are generated based on the topology database;
determine one of the plurality of VFLs associated with the destination hardware device information of the one of the plurality of other network nodes from the one or more address tables; and
generate a packet with a pre-pended packet header for transmission over the one of the plurality of VFLs, wherein the pre-pended header includes the destination hardware device information of the one of the plurality of other network nodes.

19. The network node of claim 18, wherein the virtual chassis manager is further configured to:
determine an election key based on a prioritized list of parameters for the network node; and
when the election key compares favorably to one or more of the plurality of other network nodes in the virtual chassis system, transmit a request for selection as a master network node of the virtual chassis system.

20. The network node of claim 19, wherein the virtual chassis manager is further configured to:
determine shortest paths to the plurality of other network nodes in the virtual chassis system for unicast packets based on the topology database; and
determine routing for a non-unicast packet based on the shortest paths configured for unicast packets for a source network node of the non-unicast packet.

* * * * *